(12) United States Patent
Chacko

(10) Patent No.: US 9,128,626 B2
(45) Date of Patent: Sep. 8, 2015

(54) DISTRIBUTED VIRTUAL STORAGE CLOUD ARCHITECTURE AND A METHOD THEREOF

(76) Inventor: Peter Chacko, Karnataka (IN)

( * ) Notice: Subject to any disclaimer, the term of this patent is extended or adjusted under 35 U.S.C. 154(b) by 200 days.

(21) Appl. No.: 13/877,049

(22) PCT Filed: Oct. 3, 2011

(86) PCT No.: PCT/IB2011/054329
§ 371 (c)(1),
(2), (4) Date: Mar. 29, 2013

(87) PCT Pub. No.: WO2012/042509
PCT Pub. Date: Apr. 5, 2012

(65) Prior Publication Data
US 2013/0204849 A1    Aug. 8, 2013

(30) Foreign Application Priority Data
Oct. 1, 2010    (IN) .......................... 2923/CHE/2010

(51) Int. Cl.
*G06F 17/30*    (2006.01)
*G06F 3/06*    (2006.01)
(Continued)

(52) U.S. Cl.
CPC ............ *G06F 3/0641* (2013.01); *G06F 3/0604* (2013.01); *G06F 3/067* (2013.01); *G06F 3/0659* (2013.01); *G06F 3/0661* (2013.01); *G06F 3/0664* (2013.01); *G06F 3/0665* (2013.01);
(Continued)

(58) Field of Classification Search
CPC .......... G06F 11/1456; G06F 17/30233; G06F 3/0604; G06F 3/0641; G06F 3/0659; G06F 3/0661; G06F 3/0664; G06F 3/0665; G06F 3/067; H04L 67/1097; H04L 67/2814
USPC ........................................................ 707/692
See application file for complete search history.

(56) References Cited

U.S. PATENT DOCUMENTS 8,185,715 B1 *  5/2012  Chow et al. .................... 711/170
8,533,231 B2 *  9/2013  Aizman et al. ................. 707/793
(Continued)

FOREIGN PATENT DOCUMENTS

EP      2 063 351 A2    5/2009

OTHER PUBLICATIONS

Feb. 7, 2012 Search Report issued in International Patent Application No. PCT/IB2011/054329.
(Continued)

*Primary Examiner* — Jorge A Casanova
(74) *Attorney, Agent, or Firm* — Oliff PLC

(57) ABSTRACT

The present disclosure relates to a distributed information storage system which functions as virtual cloud storage overlay on top of physical cloud storage systems. The disclosure discloses transparently solving all the data management related security, virtualization, reliability and enables transparent cloud storage migration, cloud storage virtualization, information dispersal and integration across disparate cloud storage devices operated by different providers or on-premise storage. The cloud storage is owned or hosted by same or different third-party providers who own the information contained in the storage which eliminates cloud dependencies. This present disclosure functions as a distributed cloud storage delivery platform enabling various functionalities like cloud storage virtualization, cloud storage integration, cloud storage management and cloud level RAID.

21 Claims, 19 Drawing Sheets

(51) Int. Cl.
*H04L 29/08* (2006.01)
*G06F 11/14* (2006.01)

(52) U.S. Cl.
CPC ...... *G06F 17/30233* (2013.01); *H04L 67/1097* (2013.01); *H04L 67/2814* (2013.01); *G06F 11/1456* (2013.01)

(56) References Cited

U.S. PATENT DOCUMENTS

| | | | |
|---|---|---|---|
| 8,578,076 B2 * | 11/2013 | van der Linden et al. | 710/72 |
| 8,769,035 B2 * | 7/2014 | Resch et al. | 709/211 |
| 8,805,951 B1 * | 8/2014 | Faibish et al. | 709/213 |
| 2003/0204690 A1 | 10/2003 | Yamada et al. | |
| 2008/0126375 A1 | 5/2008 | Sattler et al. | |
| 2009/0210875 A1 * | 8/2009 | Bolles et al. | 718/1 |
| 2011/0022812 A1 * | 1/2011 | van der Linden et al. | 711/163 |

OTHER PUBLICATIONS

Feb. 7, 2012 Written Opinion issued in International Patent Application No. PCT/IB2011/054329.

Dec. 7, 2012 International Preliminary Report on Patentability issued in International Patent Application No. PCT/IB2011/054329.

* cited by examiner

DISTRIBUTED VIRTUAL STORAGE CLOUD ARCHITECTURE AND A METHOD THEREOF

CROSS-REFERENCE TO RELATED APPLICATION

The present application claims priority to Indian patent application serial number 2923/CHE/2010 filed on 1 Oct. 2010, the entire contents of which are incorporated by reference.

TECHNICAL FIELD

The present disclosure relates to cloud storage virtualization and brokering. In particular, the subject-matter relates to implementation of distributed virtual cloud storage delivery platform and special cloud storage management/virtualization methods to be implemented on that platform.

BACKGROUND

Cloud computing and cloud storage networking are becoming the way IT and storage is delivered. With cloud scale storage systems, customers can now take the advantage of virtually infinite cloud resources, on demand, without spending an upfront investment. Vendors such as Amazon, Nirvanix, Rackspace offers storage resources to customers delivered on internet. Customers can now buy a minimal storage resource in their own data center and can avail cloud storage as they further require.

Cloud storage is very attractive for those customers who are on a low budget or those who cannot predict their storage demands or those who want to store their mission critical data in well protected. Cloud storage also offer various cost advantages in terms of operational expenses, as customers don't need to spend on managing, administering storage systems.

Other compelling advantages include backup, archives, storing reference and secondary data. Many File servers, Database Systems store enormous amount of data that is not needed on their day to day business, but need to access these data on compliance/regulatory/legal discovery needs.

So cloud storage is very beneficial to enterprises/individuals in many ways, but customers have many new issues now. When customers use many cloud storage providers, there is no mechanism to have a unified view of all storage that lives in all storage silos, and there is no benefits of virtualization that span across all such silos.

When customers access the cloud storage hosted thousands of miles away, unexpected WAN latencies will bring down the application response times. If the WAN connection is severed, the customers cannot access the cloud storage. If the cloud provider goes down, still data becomes unavailable. Because of these multiple issues, customer finds it difficult to adopt cloud storage in to their data center planning. When a cloud service provider goes out of business, there is no way to insulate that disruption to users who have stored data in the providers cloud. Many cloud providers impose a limit on the size of the file stored which is a problem for many users who deal in large files. Many cloud users may not have any facility to buy or manage a cloud brokering system in their premise. Customers will end up storing the same data more than once, from different locations, as there is no de-duplication software developed to be consumed from a cloud API.

Therefore, there is a strong need to provide for an architecture and method to overcome the above-mentioned problems.

SUMMARY OF THE DISCLOSURE

The shortcomings of the prior art are overcome and additional advantages are provided through the provision of a method and a system as described in the description.

The present disclosure provides a virtualization layer at cloud storage level that provides transparent cloud storage migration.

The present disclosure provides a logical layer that integrates all cloud storage data, securely, in an optimized delivery mechanism, in the context of multiple cloud storage providers.

In one embodiment, the disclosure relates to a transparent virtualization layer that abstracts out different cloud storage operated by different providers, provides various data services from the cloud or from an on-premise gateway, for cloud storage traffic, realizing cloud storage virtualization experience, for avoiding single cloud storage provider lock-in, as well as on-premise storage in a way that make cloud storage access, possible with the same access semantics/interface of the conventional storage systems. Customer can now use storage from multiple cloud providers or on-premise storage through the virtualization layer, without knowing. Using the present disclosure, if a single service provider goes out of business, the business of customer is not impacted.

Accordingly the present disclosure relates to a distributed virtual storage cloud architecture comprising at least one client machine communicatively connected to one or more cloud storage devices to exchange data. The one or more cloud storage devices store the data of at least one client machine. The architecture further comprises at least one cloud proxy connected between the at least one client machine and the one or more cloud storage devices. In at least one embodiment, the cloud proxy comprises a firewall module configured to receive and authenticate a service request from the at least one client machine, a load balancer to distribute the service request among one or more processors of a cloud storage hypervisor. The cloud proxy also comprises a database configured to store metadata corresponding to each client machine and information about the data exchanged between at least one client and one or more cloud storage devices through the cloud proxy. The cloud storage hypervisor upon receipt of the service request, performs at least one of storing the data on the one or more cloud storage devices, and/or retrieving the data from the one or more cloud storage devices, performing one or more data services on the data exchanged between the at least one client machine and the one or more cloud storage devices and updating the database with the information about the data exchanged and the data services performed. In at least one embodiment, at least two cloud proxies are distributed at different geographical locations, exchanging the metadata across all the cloud proxies, and replicating the metadata on the at least one cloud proxy.

Accordingly, the present disclosure relates to a method to manage data using distributed virtual cloud storage delivery architecture comprising the acts of receiving a service request by a cloud proxy from at least one client machine to access services of one or more cloud storage devices. Then, selecting the one or more cloud storage devices for servicing the service request based on predetermined conditions, wherein the cloud proxy upon receipt of the service request performs one or more data services on data to be exchanged between the at least one client and the one or more cloud storage device. Further, the method comprises forwarding the request to the selected one or more cloud storage devices for accessing the data. Upon receiving the request to retrieve the data, the method receives the data by the at least one cloud proxy from one or more cloud storage devices and forwards the received data to the client machine. Upon receiving the request to store the data, the method receives the data by the at least one cloud proxy from the at least one client machines, and forwards the received data to one or more of the cloud storage devices. Further, the method comprises updating the database with information about the data exchanged and the data services performed, and replicating the information to the at least one cloud proxy.

The present disclosure also relates to a caching mechanism that lets customer use the storage when disconnected from the cloud.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The features of the present disclosure are set forth with particularity in the appended claims. The disclosure itself, together with further features and attended advantages, will become apparent from consideration of the following detailed description, taken in conjunction with the accompanying drawings. One or more embodiments of the present disclosure are now described, by way of example only, with reference to the accompanied drawings wherein like reference numerals represent like elements and in which:

Figure 1:
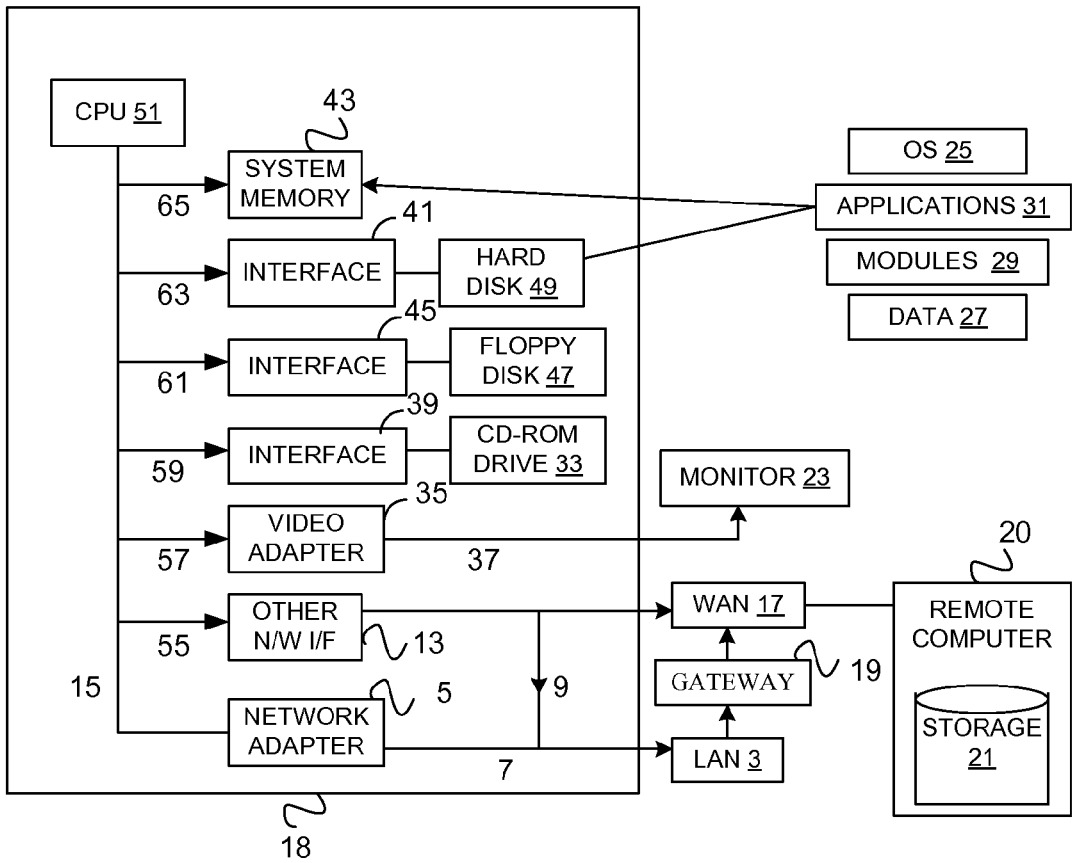
FIG. 1 is a block diagram of a computer system connected to internet, accessing the storage remotely.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Following sections describe other terminologies/key terms used in the application.

Cloud: Cloud is network or networked data center comprising a group of computer, network and storage devices, running machine executable program instructions or storing or processing machine storable digital data. Referring to FIG. 1A an exemplary cloud's block diagram, data access is first received by the firewall 1001, then application traffic is processed by the virtualization layer 1002. The cloud also comprises processing provisioning logic and billing info 1004. The other key part in the cloud is virtualization layer that virtualized physical resources. If it is a cloud computing, these virtualization layer typically be a hypervisor like Xen, xen as VmWare, If this is a cloud storage, then this is a file virtualization layer that virtualizes the underlying file servers like denoted by 1006.

File Servers: File server is a server machine where it runs a standard network file access protocol like NFS (developed by SUN Microsystems) or CIFS (developed by Microsoft). File access is issued by any computer connected to IP network that performs file access over NFS/CIFS protocol.

A proxy is also a computer system that intercepts some sort of traffic over the local area networks, Wide Area Network or internet and does some processing and then redirects the request to another server, and receives the request back and sends back the request back to the original client. In the context of disclosure, the proxy here intercepts all the traffic between the client and to a destination cloud, hence called cloud proxy. In one embodiment, the cloud proxy is one or more instances of any form of a networked computer systems or any single computer system having the ability to receive and transmit data across any standard network interface.

RAID: RAID is data protection technology where different blocks of data are mirrored, stripped or pur-encoded, so that if any one or more disks fail, data is still recoverable. There are various types of RAID. RAID 0 is a simple stripping where different blocks of data is stripped in to various strips and written in to different disks. RAID 1 implements mirroring. RAID 5, 6 all involve using pur-encoding. There are other enhancements like erasure-coded RAID in the literature.

Private, Hybrid, Public, Federal

Private cloud is a private implementation of an enterprise for it's own use. It can also be hosted in a third party provider, but owned and managed by the customer, alternatively referred to as client machines. Public cloud is hosted, owned and managed by the third party provider. Hybrid and federated cloud is different amalgamation/union of private and public clouds in accordance with the policies of the providers involved. Hosted private cloud storage is dedicated, third-party managed cloud storage, owned by customer or provider.

CSH: Cloud storage hypervisor, topic of this invention.

Cloud file is the file stored in cloud storage. Cloud file virtualization involves virtualizing access to cloud file in a way that transparently redirect the file access.

The accompanying descriptions are for the purpose of providing a thorough explanation, with numerous specific details. Of course the field of cloud storage/networked storage is so vast that many different variations of the described and illustrated disclosures are possible. Many implementations are possible with ideas that can be derived from this, that match new protocols of storage or different data center environment. The accompanying description is for the purpose of providing a thorough explanation with numerous specific details. Of course, field of cloud and storage networking is such that many different variations of the illustrated and described features of the disclosure are possible. Those skilled in the art will thus undoubtedly appreciate that the disclosure can be practiced without some specific details described below, and indeed will see that many other variations and embodiments of the disclosure can be practiced while still satisfying its teachings and spirit. For example, although the present disclosures are described with reference to cloud storage, it can similarly be embodies in any form of utility/grid based storage clusters or data centers running various protocols including iSCSI, FCIP, CDMI, NAS, HTTP, SQL and AoE etc.

The process features, or functions of the present disclosure can be implemented by program instructions that execute in an appropriate computing device. Computing devices include but not limiting to enterprise servers, application servers, work stations, personal computers, network computers, network appliances, personal digital assistants, set-top boxes, and personal communication devices. The program instructions can be in any appropriate form, such as source code, object code, or scripts.

In at least one embodiment of the disclosure, there are primary three components involved. Client software that runs in the computer system connected to network, proxy software that runs in the same computer or in another computer attached over an IP network, connect hereinafter called cloud proxy, or Virtual Cloud Storage Network (VCSN) more than one public cloud providers, hereinafter called CSP or cloud providers. All components are connected through any communication network, capable of transporting IP or MPLS packets or any data related communication protocols.

Figure 1A:
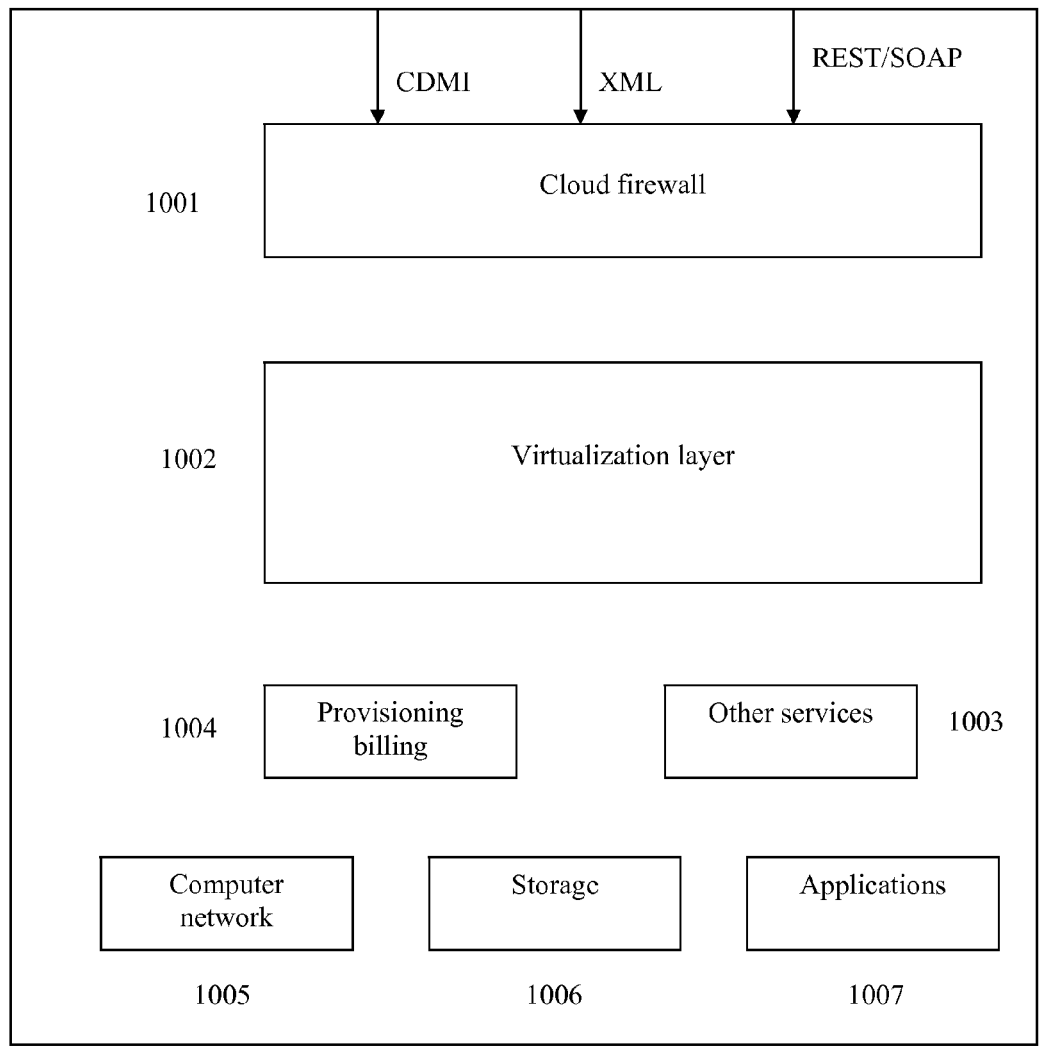
FIG. 1A is a block diagram illustrating cloud storage with virtualization in accordance with an at least one embodiment of the present disclosure.

FIG. 1 illustrates an example of a computer system that can serve as a fundamental operating environment for the illustrated disclosure. With reference to FIG. 1, an exemplary computer system for implementing the disclosure includes a computer (such as File server, minicomputer, PC, laptop, palmtop, set top etc including a processing unit 51, a system memory 43, and system bus 15, that couples various system components including the system memory to the processing unit 51. The processing unit can be any of various commercially available processors, including Intel x86, Pentium and computable micro processors from Intel and others like (IDT, Motorola, IBM, MIPS, AMD or similar electronic disclosure that has similar functionality and cane be classified as a computer system. The computer 18 can operate in a networked environment using logical connection to one or more other logical connections to one or more other computer systems 20. The other systems can be servers, routers, Firewalls, gateways, switches etc. These devices further connect other computer systems. When used in a LAN networking environment, the computer 18 is connected to local network through 3. Further, the computer can also be connected to WAN and internet. The network connections shown are exemplary and other means of establishing a communication link between the computer systems (like Ethernet card, ISDN terminal adapter, ADSL modem10 BaseT adapter, 100 baseT adapter, ATM adapter etc, can be used.

Figure 2:
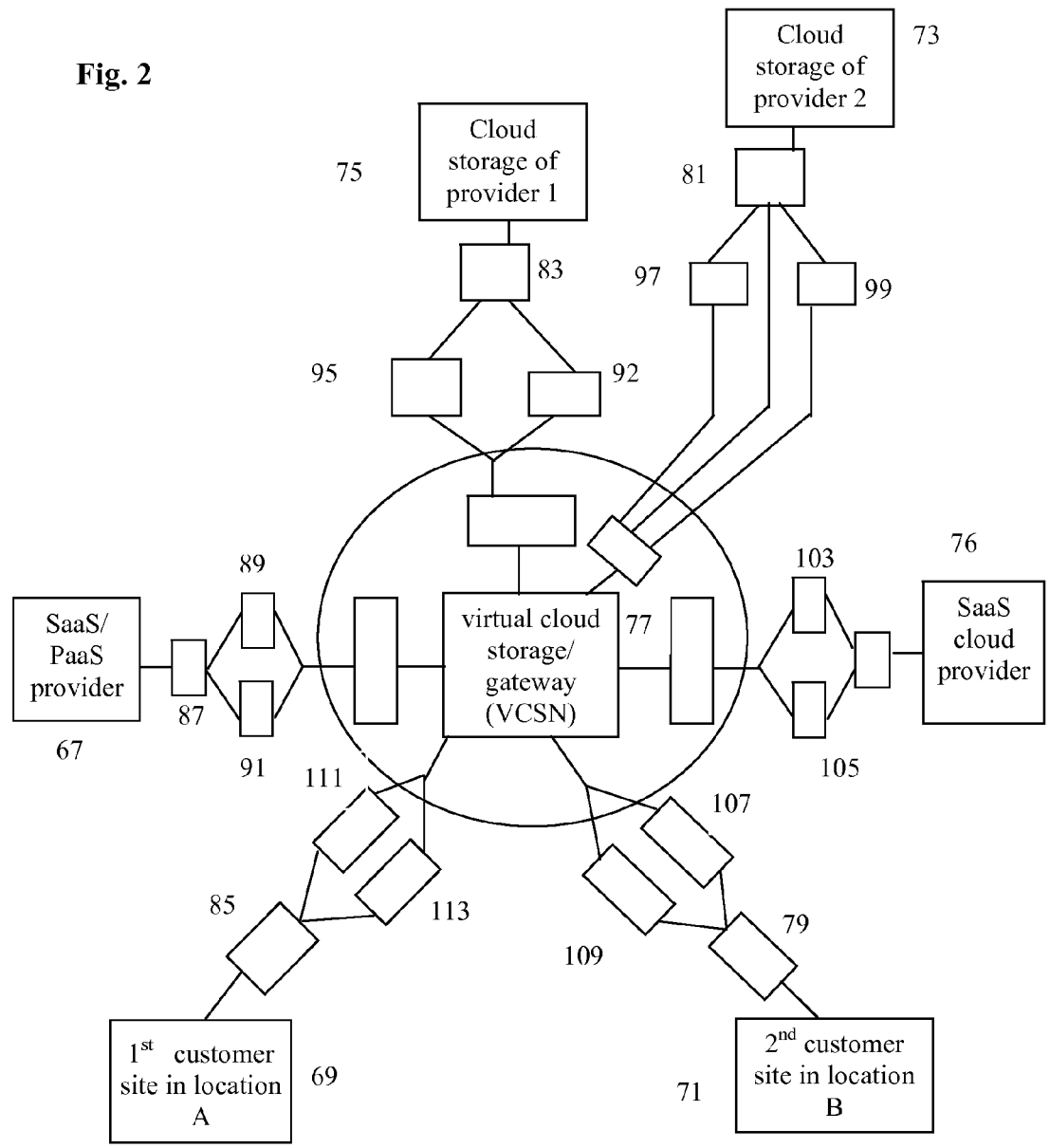
FIG. 2 is a block diagram of a client server network with a cloud storage gateway in accordance with an embodiment of the present disclosure.

Referring to FIG. 2, which shows at least one embodiment of the invention, storage data is originated from the customer site 69, goes through the network controller 85 and then through multi-homed links 111 and 113 to arrive at virtual cloud storage network 77 as mentioned through the first network interface, at least one of 878 or 879 (only two interfaces are used in the illustration). Inside the virtual storage delivery platform, VCSN(also referred as CSH or cloud proxy) make all other third-party storage providers as a logical pool of storage resources, through any of the second network interfaces of 877 or 880, which can be added or removed on-demand Block 75 is a cloud storage device, as well as 73. 75 and 73 can be located at, operated and managed by multiple cloud providers. 71 and 69 are customer locations. 67 is SaaS/PaaS provider location. 76 is another provider location. 77 is a CSH instance running. Here client machines can be any one of 67,71,69,76 contacting CSH and exchanging data in any of the protocol like XML web service, HTTP, NFS, CIFS or well known cloud APIs like amazon cloud API or any form of XML encoded data over HTTP protocol which is compliant to CDMI standard. All client machines think that CSH as the actual cloud storage device, while CSH will present itself as the client machines to all cloud storage devices such as 73 and 75. CSH will receive the request from client machines, extract all the data needed to serve the cloud request, and then determines the actual cloud storage device, based on the customer data, and send the request to the respective cloud storage device. A CSH is transparent to clients and cloud storage devices, CSH is a virtual cloud storage device. Customer can request a specific provider or a specific data services for their requests. Customer information is stored in a database in the CSH. This information can also be obtained by contacting the customer or setting up an agreement with the customer about the various cloud storage devices where customer data will be stored, or the service quality they need etc. Based on this info, CSH metadata database is configured for serving the cloud service from the customer. As the actual cloud storage device is behind the CSH, transparently, CSH essentially performing cloud storage virtualization functionalities, such as abstracting out the actual cloud storage device by decoupling the real cloud storage device and the client machines, and redirecting the cloud requests to various cloud storage devices. delivering cloud storage virtualization services, as the traffic flow through it. Services includes various data services, such as de-duplication, information dispersal, cloud file virtualization, cloud storage aggregation, cloud migration and many more data related, services which can be performed on stored or data in transit. All such data services, are offered as a cloud service on a data services platform as a service model. Clients can send cloud request to one protocol, while CSH can send data to cloud storage devices in a second protocol. The necessary translation information is stored in the metadata table as well as CSH has the software that implement the specific protocol of cloud storage devices.

Figure 3:
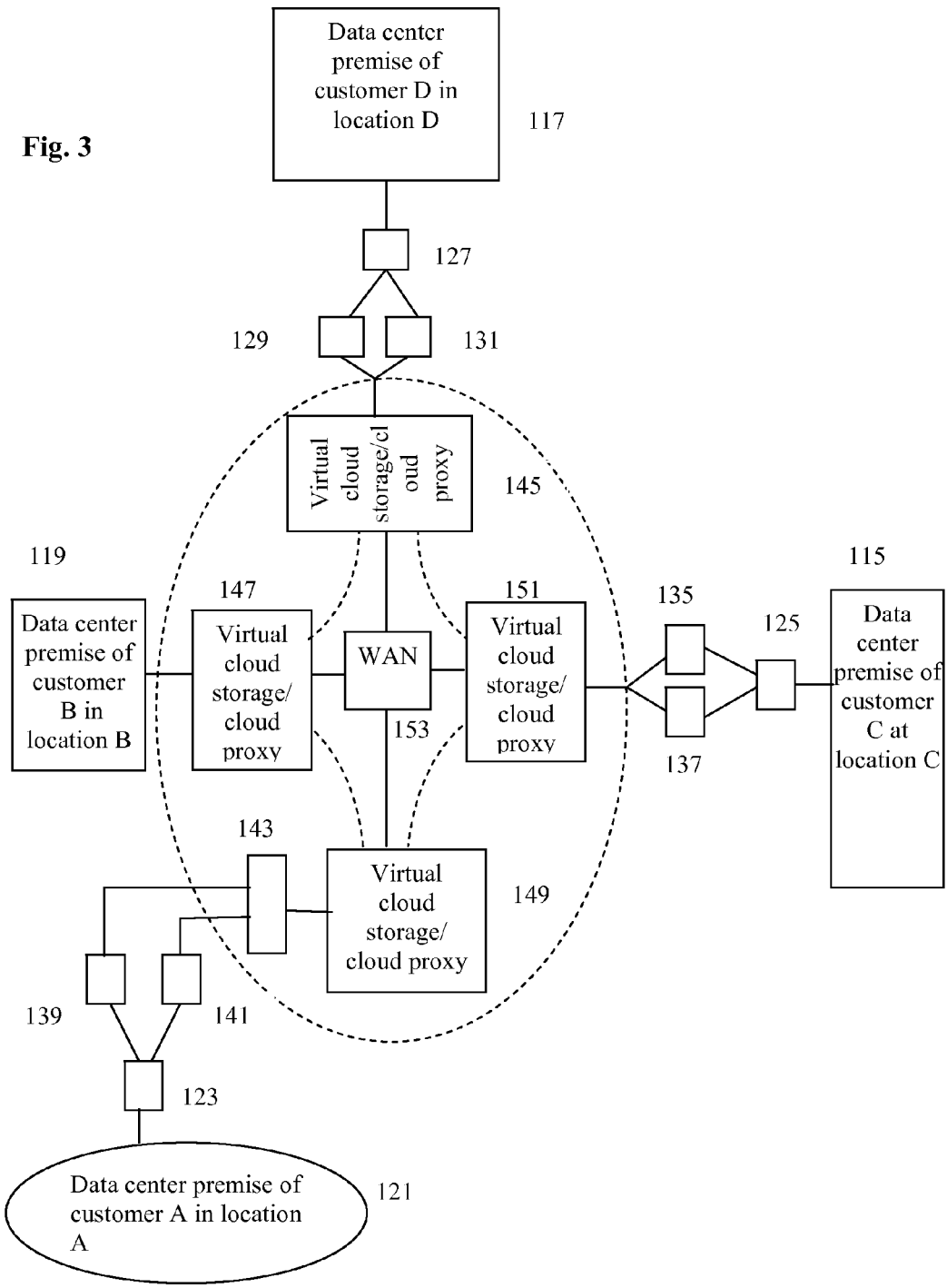
FIG. 3 is a block diagram of a distributed and geographically dispersed virtual storage cloud gateway in accordance with an embodiment of the present disclosure.

Referring to FIG. 3, distributed aspects of one embodiment of the invention is described. Customer 121 and customer 117, 119 and 115 get serviced by a load balanced, geographically dispersed, distributed virtual cloud storage, which pools storage resources from one or more third-party cloud storage providers (for simplicity, it is not shown the figure). In an embodiment, for illustrative purpose, four instances of virtual cloud storage are shown, as 149, 147, 151, and 145, which are coupled by any form of Wide area network. All these instances exchange the metadata information across a wide area network 153 and share state info for load-balancing. All these instance of the cloud proxy devices (alternatively referred to as cloud proxy) share same IP address or sets of same IP addresses for serving a specific geographic location. In at least one embodiment of the invention, anycast addressing is used. In at least one embodiment, DNS based load balancing used. In still another aspect of the invention, Virtual IP addressing is used. In at least one aspect of the invention, IP multi-cast is used. 119 is location of a customer, as well as 117, 121, and 115 all send cloud requests to cloud proxy device. If, for example one of the cloud proxy device, 149 is un-available, any one of the other 147, 145, 151 can receive the request and serve the client. VCSN also monitors the age of each storage objects, and based on the policies or customer requests, data is over written with raw zero filled bytes, for securely remove the objects after its life cycle expires.

As per the disclosure, a client machine sends cloud requests to cloud proxy. Cloud proxy redirects the access to a specific CSP based on various metrics like cost of CSP, geographical location of the CSP, business value of the cloud file. The decision is based on the business priorities or other policies configured on the cloud proxy. The actual CSP is then selected. Cloud proxy then translate the cloud request in to an object request that may results in sending the request to more than one CSP, in their own storage access protocols or Application Programming Interface (APIs). CSP return the requested object, cloud proxy translates the object back to the original storage object and client storage object access is finished. Cloud proxy has the ability to move the same file or storage object to more than one CSP, so that if one CSP is down or unavailable cloud proxy can retrieve the file or similar storage object through other CSPs. In the embodiment, there is no association a client file or similar storage object to an actual CSP, visibly by client computer. That is, real physical cloud storage is virtualized by cloud proxy. Cloud proxy acts as a hypervisor to cloud storage, realizing the cloud storage virtualization. Cloud request can be comprised of any protocols, including but not limited to, iSCSI, AoE, CIFS, NFS, HTTP, XML, REST, SOAP, CDMI, SQL, RDP/VDI, MAPI/SMTP etc.

Figure 4:
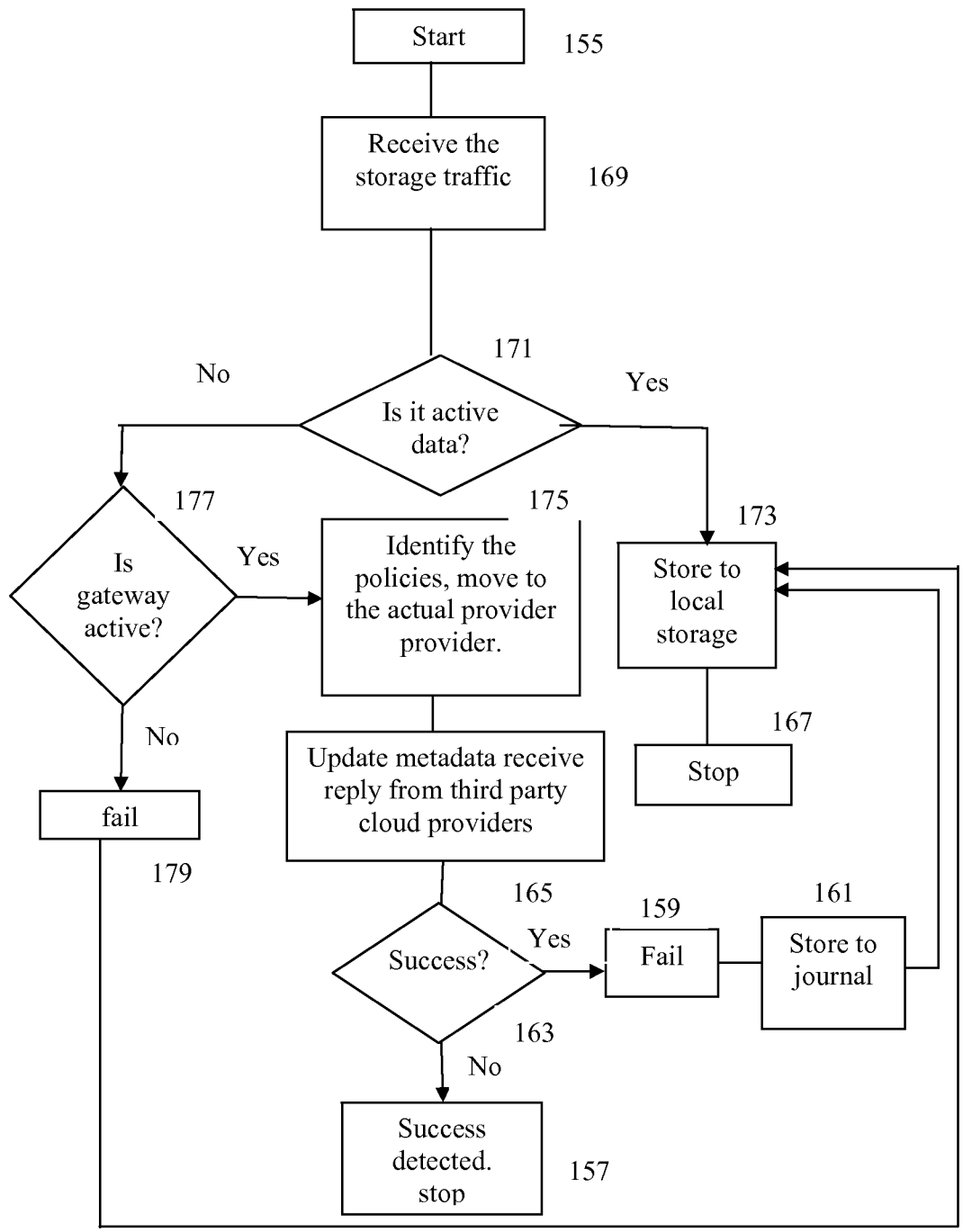
FIG. 4 is a flow chart for the data flow in cloud proxy, in accordance with an at least one embodiment of the present disclosure.

Referring to FIG. 4, data flow starts at step 155, and cloud proxy receives the cloud storage traffic at step 169. At step 171, the method checks whether data is active data or not, and is stored locally if it is active, for cloud storage caching purpose. At step 177, the method checks whether gateway is active or not, and at step 175 it identifies all policies configured for this customer traffic, and applies all data services configured for this traffic. At step 165, the method persists the metadata, sends the traffic to various cloud providers, as well as waits for reply from all cloud services. At step 159, it detects a failure after repeated attempts, and at 161 it will be moved to an error journal, which will later be stored locally at 173. At 167 it stops. Step 179 will follow a logic to recovery as it found gateway inactive and error will be logged at step 173.

Figure 5:
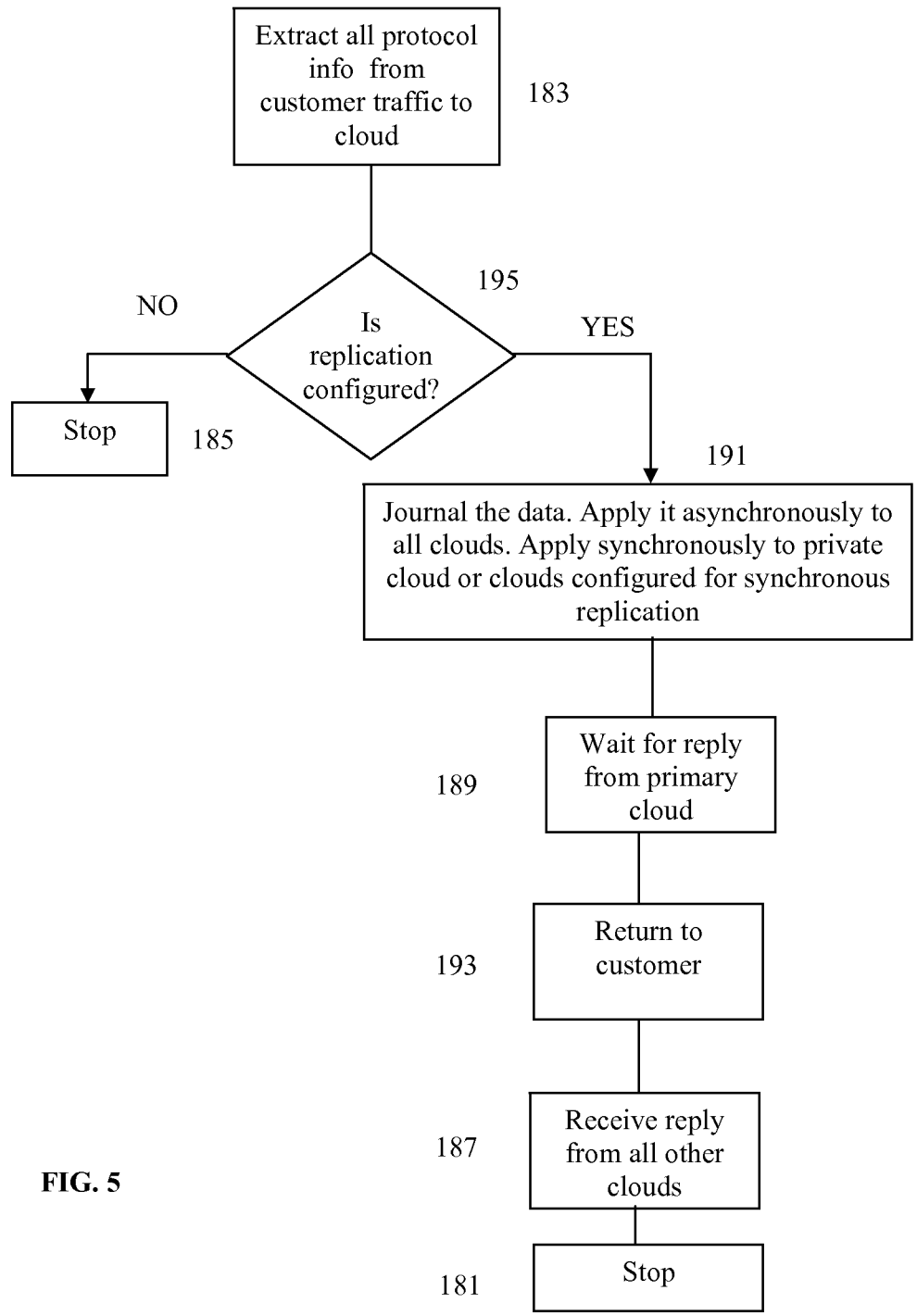
FIG. 5 is a flow chart describing the cloud based replication service in accordance with an embodiment of the present disclosure.

VCSN has the ability to support cloud based, storage replication for high availability and disaster recovery purpose. Referring to FIG. 5, in step 183, VCSN extracts all storage protocol related information to make decisions based on the storage protocol based content routing, and at step 195 the method checks for replication status. If it is configured, it goes to step 191, where it journals all operations in the request and applies synchronously to at least one third-party cloud storage, and asynchronously sending requests to other cloud storage devices. At 189 it waits for the success results from at least one cloud storage device. VCSN then replies to customer appropriate status. In step 187, it will wait for all replies from all providers, and then update its metadata. VCSN also has the ability to function as a cloud storage hypervisor, which essentially play as the virtualization hypervisor of various cloud storage operated by third-party providers.

Figure 6:
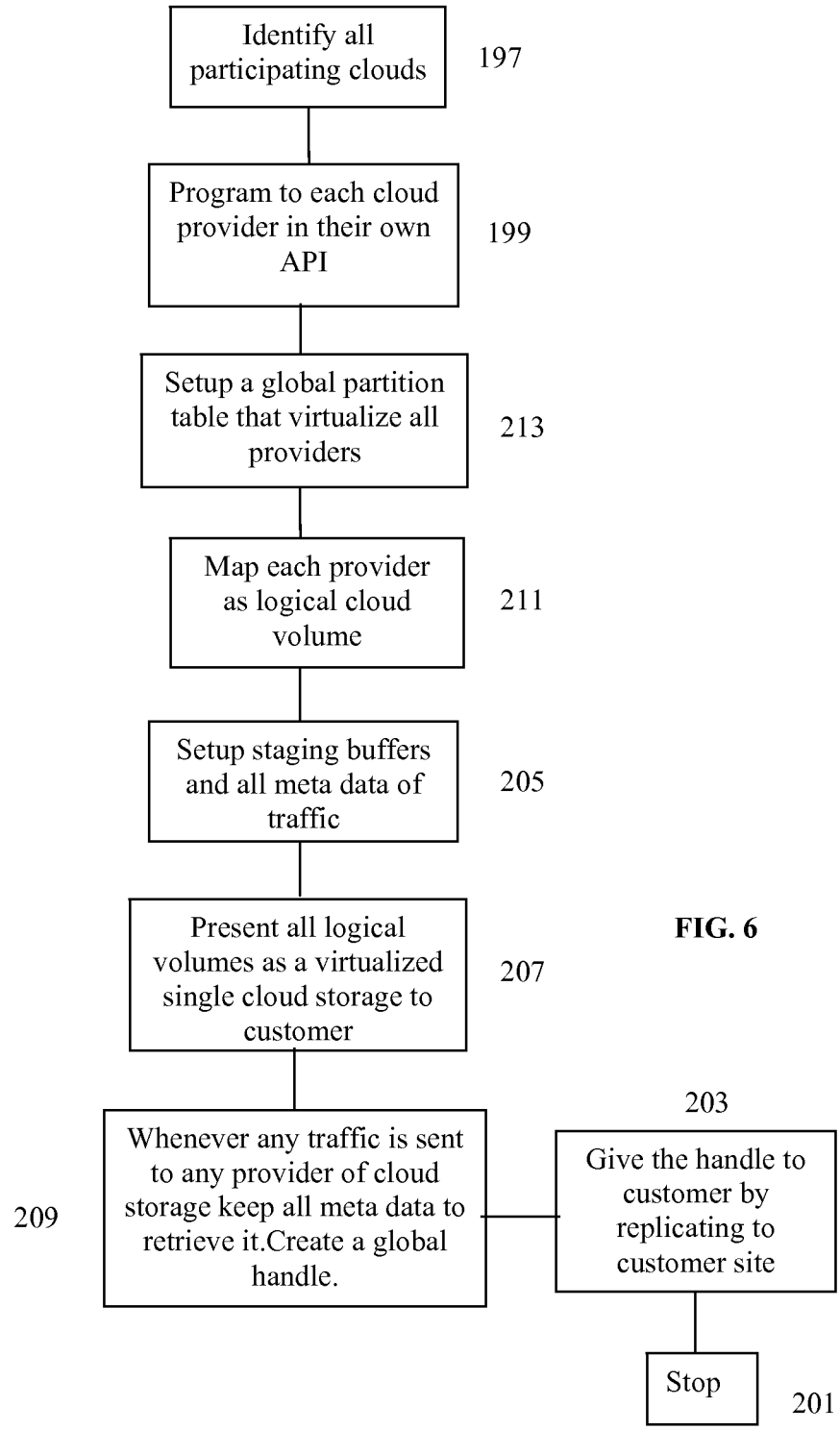
FIG. 6 is a flow chart illustrating the cloud storage virtualization service in accordance with an embodiment of the present disclosure.

Referring to FIG. 6, at step 197 VCSN identifies all participating cloud storage providers, and store a local table which maps all providers as a logical cluster. At step 199, VCSN program in each provider-API to each cloud storage. At step 213, global partition table along with the capacity, and other info like storage policies, costs, latency metrics, key performance indicators are setup. At step 211, each virtual cloud volume is built. At step 205, a staging buffer is set, so that any cloud storage becomes busy, traffic can be journaled. At step 207, the aggregation of all cloud storage is presented to the customer as single, virtualized cloud storage. At step 209, all storage traffic is intercepted and sufficient meta-data is stored in the VCSN metadata table. VCSN also create enough mapping information such that all storage resources from all providers can be accessed. At step 203, this mapping information is replicated to the customer, so that if the VCSN itself goes down, customer can directly access their data from the correct cloud storage provider. At step 201 algorithm stops.

Figure 7A:
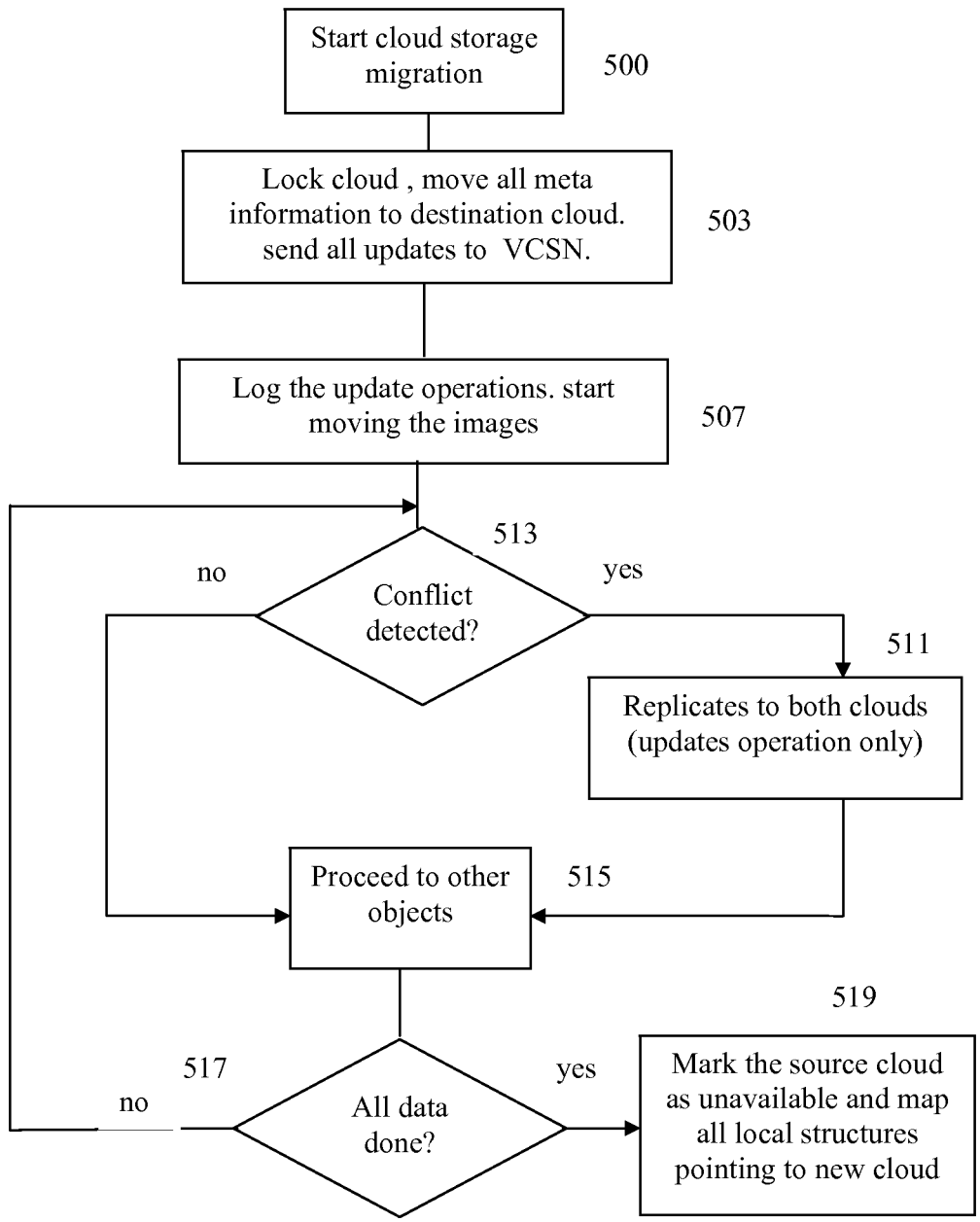
FIG. 7A and FIG. 7B illustrate a flowchart showing non-disruptive cloud storage migration mechanism in accordance with an embodiment of the present disclosure.

Referring to FIG. 7A, a non-disruptive cloud storage migration mechanism is disclosed. At step 500, migration process is initiated where VCSN start moving the metadata related storage from the first cloud provider to the second cloud provider, during which period, data access is stopped. This is typically a very small period, and all customer traffic is temporarily terminated/served by the VCSN itself. But if its non-update/query traffic, it's re-routed to first cloud storage provider. Once the metadata is moved to the destination cloud, data movement starts in step 507. In step 513, a conflicting access is detected. At step 511, all client machine requests that store any new met data is replicated to both cloud, so that both clouds are in synchronized state. In this phase, all objects are moved one by one to the new cloud and if there is a conflict detected, the object is marked as busy and proceeds to another object. Once all objects are moved, the first cloud is marked as de-commissioned and the customer traffic is re-routed to new cloud, without any disruption to customer's application. If all data is moved, at step 519, source cloud storage device is marked as un-available.

Figure 7B:
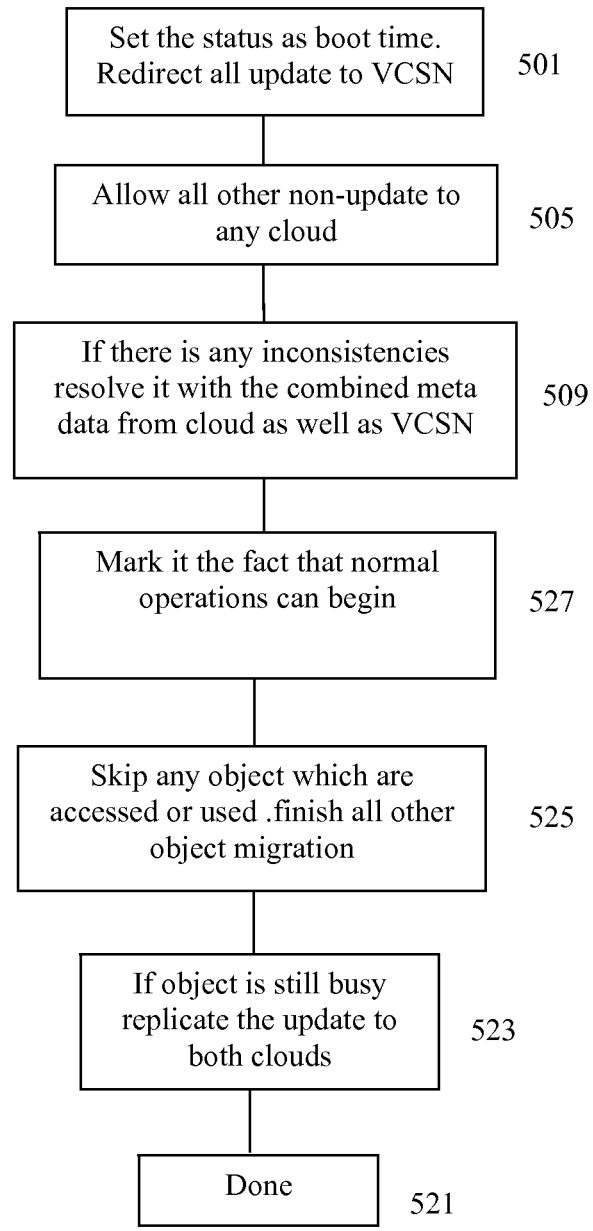

Coming back to the conflicts, refer FIG. 7B. There are various cases when VCSN can detect conflicts. For example, VCSN starts the migration process with metadata migration, which is carried out at step 501. At step 505 all non-update operations are allowed. Initial state is called migration boot time phase, during which phase all UPDATE cloud operations are just logged in the cloud journal storage, and migration is allowed to proceed as if no update has happened. If there is a query operation, and it also involves the objects which are in the journal storage, query is satisfied with both locations, i.e. first cloud storage and journal storage, in step 509. After this phase, VCSN move to a user data migration phase, and normal operations begin as in step 527, wherein all user data of all objects are moved to the destination cloud. If any metadata UPDATE arrives, it is applied to both cloud providers. If object is found busy, it is skipped, but marked for retry as in the step 525. At step 523, it is retried again, and if found busy again, all customer cloud operation is replicated to both the clouds.

VCSN also maintains all metadata of all objects stored in the third-party cloud storage. If a cloud request arrives to the VCSN about an object which is stored in the third-party cloud storage, VCSN will respond to the customer from its own metadata. VCSN also makes all on-line storage objects and off-line storage objects (which are stored in the third-party managed or remote cloud storage), in a single logical view, and is accessible over a unified interface, like an NFS, iSCSI or CIFS request. In this way, VCSN realize the ability to the customers for easy and access to off-line, archived, data with the same ease of accessing on-line data. VCSN understand the storage protocol such as CIFS, NFS, iSCSI, SOAP/REST, SQL, AoE or other CDMI compliant protocols.

Figure 9:
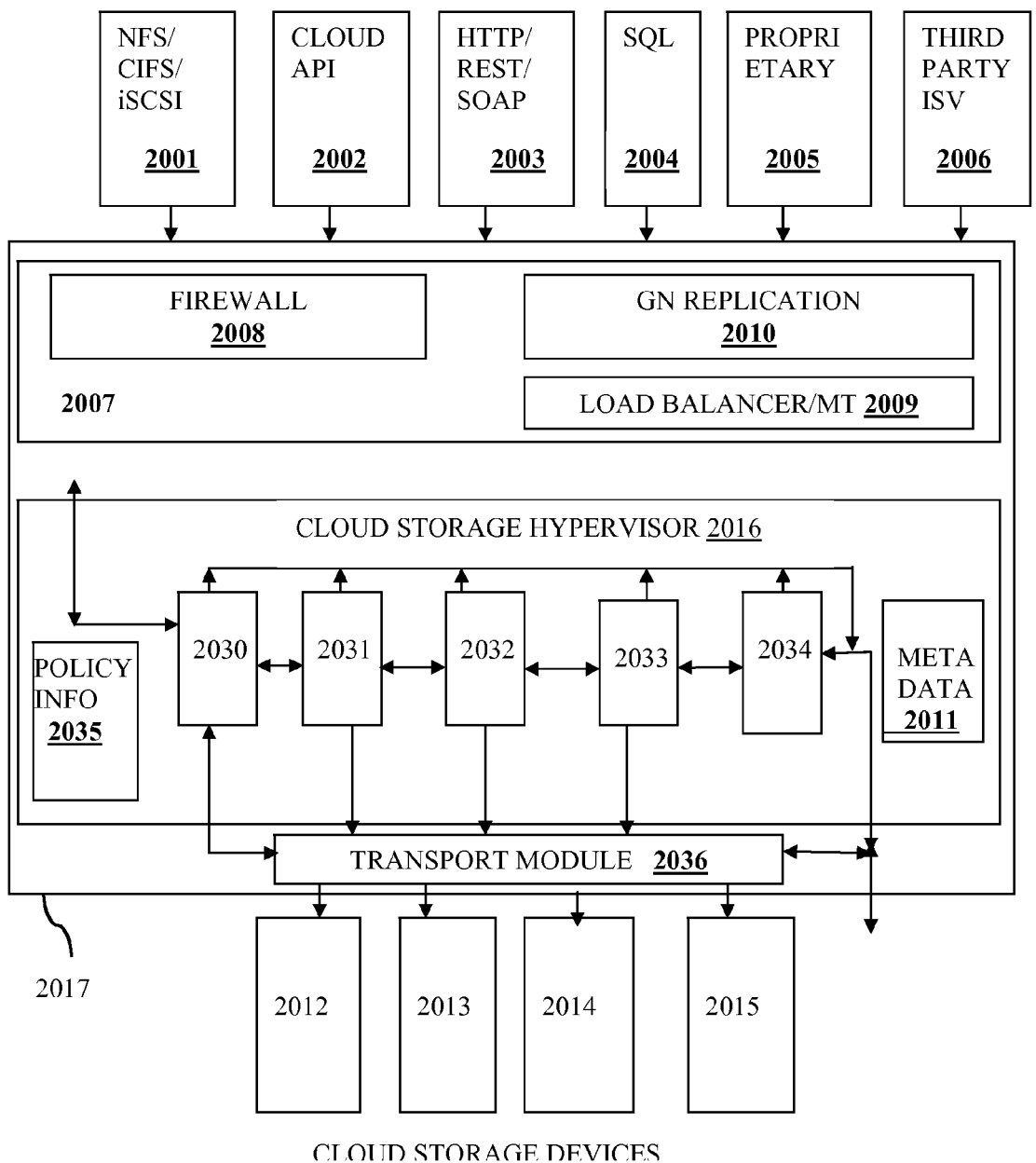
FIG. 9 is a block diagram illustrating an example of the internal components of the architecture for distributed virtual cloud storage delivery platform in accordance with an embodiment of the present disclosure.

FIG. 9 illustrates architecture for one instance of the virtual cloud storage delivery platform while FIG. 3 illustrate the distributed virtual cloud storage delivery platform, in accordance with one embodiment of the invention. Various client applications/interfaces or client machines are shown in 2001, 2002, 2003, 2004, 2005 and 2006 which may be located in any part of WAN/Internet or from a corporate data center/organization. Block 2001 shows a standard storage protocol access including but not limited to NFS, CIFS and iSCSI which are standard network storage protocols. Block 2002 is any CDMI compliant cloud API, block 2003 is a web service requests (REST based or SOAP based), block 2004 is SQL access, block 2005 is any proprietary access, and block 2006 indicates third party product interfaces. A cloud proxy, alternatively referred to as VCSN or CSH (stands for cloud storage hypervisor), 2016 sits between clients and actual cloud storage devices 2012,2013,2014,2015. Clients are connected to the client machines/interfaces through any form of network. This cloud proxy can be distributed globally across distributed data centers for high availability and geographical data delivery, (as internals of each instance is same, only one instance diagram is shown). As shown, client side access can emanate from any device such as mobile phones, PC, servers, gateways, routers, any form of compute machines capable of sending IP or MPLS based data packets. Blocks 2012, 2013, 2014, 2015 indicate single or multiple cloud storage devices or any cloud where storage resources are serviced from, as a cloud service model. The cloud proxy 2016 functions as an intermediary layer, delivering various data services for the cloud storage traffic. Clients and cloud storage devices don't experience the existence of cloud proxy, as cloud proxy understand the protocols of clients, and transport module 2036 translate all requests to the cloud service protocols of the actual cloud storage devices. For example if 2012 only understands NFS protocol, CSH will translate the cloud service request from clients to NFS protocol. If 2013 only understand HTTP, CSH will redirect the cloud service to 2013 in the same protocol. Policy info contains the configured services information related to clients, such as each customer's choice on the actual cloud storage services, and thereby the actual cloud storage devices the requests should be re-directed to, are determined.

A request from any source is first processed by a firewall module 2008 in the cloud proxy. The request is then processed by the multi-tenant load balancer 2009 which redirects the data to data services application modules. The data services include but are not limited to data de-duplication, information dispersal, data integration, data migration, cloud file virtualization, file level RAID and cloud volume management. In one embodiment, the data services comprise any data engineering services or any data security services. Modules 2007, 2010 and 2017 can run in the same computer or different computers. Typically, for load balancing considerations, modules 2007 and 2009 will be implemented as an appliance, and 2017 will be a cluster of compute grids, to balance the load as well as multi-tenancy considerations. Data is load balanced in such a way that customer Quality of Service (QoS), Service Level Agreements, security expectations are met, by redirecting the data to the correct grids having correct services running. Once the request is processed by 2017, each request is processed by data services modules 2030, 2031, 2032, 2033 and 2034 in any order. In between the processing, various forms of data transformation such as Reed-Solomon encoding for erasure protection, data de-duplication, and data obfuscation are applied. In between or during the end of any processing a replication module 2011 does the Global node replication to other cloud proxy devices, after local DB 2011 is updated. After the processing, data will be forwarded to various cloud storage devices owned by same or different third-party storage providers or owned by the customer who originated the services to the cloud proxy. If the client requests for any data, with a read/query/search request, various modules in CSH look up in the metadata table 2011 and find the necessary information or mappings to request data from the physical storage clouds, such as 2012, 2014, 2015 and 2013 causing a reverse data transformations in at least one embodiment, which will then delivered to the customer machines. Clients always send data to 2016, thinking that cloud proxy is the actual cloud storage device. As 2016 is transparent to clients or cloud storage devices, 2016 implement a virtual cloud storage abstraction. As CSH implements a virtual storage cloud abstraction, it needs to translate the first storage parameters related to a cloud service request from client to a second storage parameters, before sending the requests to the cloud storage devices. For example FIG. 10 is a block diagram of the components of the cloud based storage firewall module in accordance with an embodiment of the present disclosure.

Figure 10:
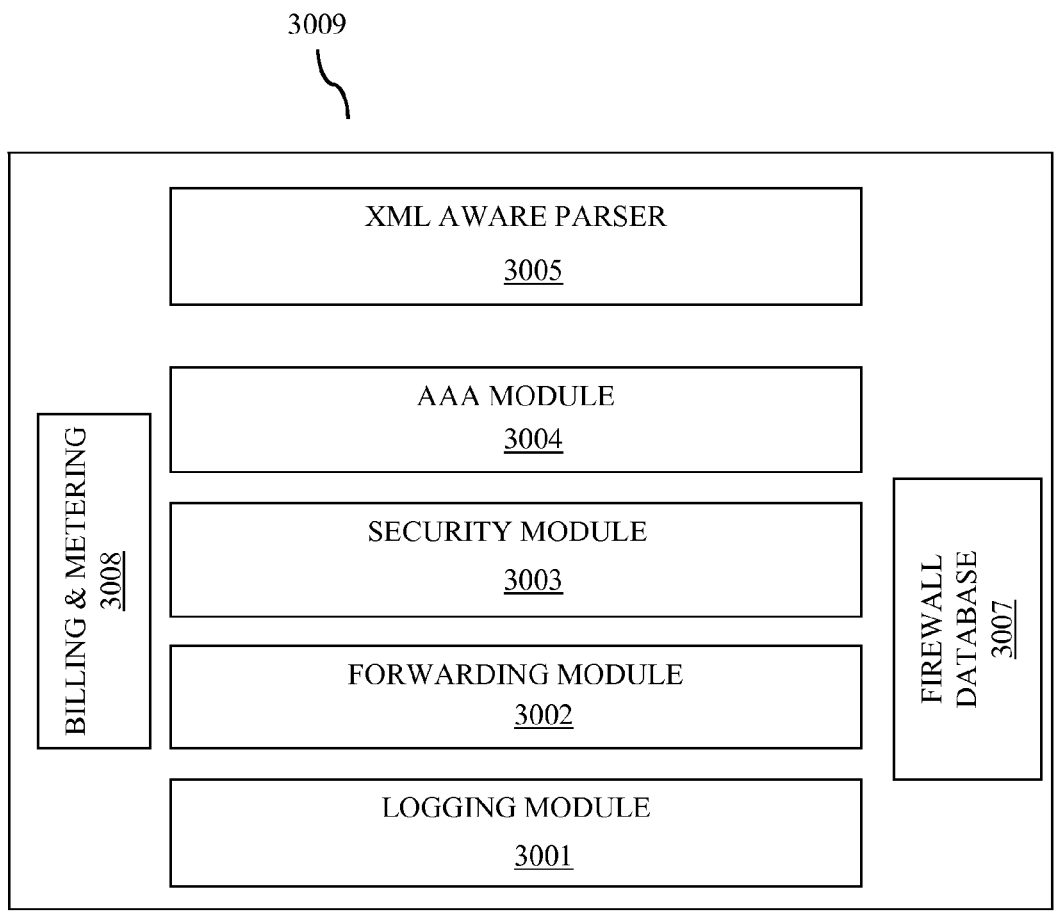
FIG. 10 illustrates the example of a block diagram of the components of the cloud based storage firewall module in accordance with an embodiment of the present disclosure.

Referring to FIG. 10 is the internal components of the service that does the XML aware security screenings, authentication, authorization and auditing of request services such as REST, SOAP, or other protocol based requests. Upon receiving each request, the potential header is extracted, and various XML encoded parameters of the protocol are separated at 3005. Parameters can be different from request to request. For example, the parameters can be name of a storage container that the user is trying to create, name of an object that the user is trying to delete etc. In every case, firewall module will look up the firewall data base 3007, to validate the further user credentials with various policies configured by AAA module 3004. The security module 3003 then execute other aspects of security credentials of the request and then the request is forwarded at 3002 to the data services module. Similarly, for the traffic received from the data services module billing and metering info is updated by billing and metering module 3008. As cloud computing or any cloud services are run by pay-as-use model, updating the billing/resource usage info is important. Firewall module also maintains various session parameters such as IP address and port members of the source host, customer id of the source etc. Load balancing module executes various algorithms such as simple hashing, or least busy server based or based on the SLA parameters to redirect the request to appropriate processor of cloud storage hypervisor. 3007 is a database to facilitate the operations of firewall. After every cloud request is processed, information about the request is logged and persisted by the logging module 3001, so that the same information can be produced by the vendor and customer for compliance purposes.

CSH always perform a common step for all data services performed on the traffic. CSH extract the various metadata in the cloud service request, also called first storage parameters. CSH then look up in the metadata Data base, for the respective values in the table corresponding to the first storage parameters, creating second storage parameters. Second parameters are used to send the cloud service request to the cloud storage device. Cloud storage device will respond with a third set of storage parameters and send the reply back to CSH. CSH will then again map those values to the correct metadata to be used for responding to the clients, which is fourth storage parameters.

Figure 11:
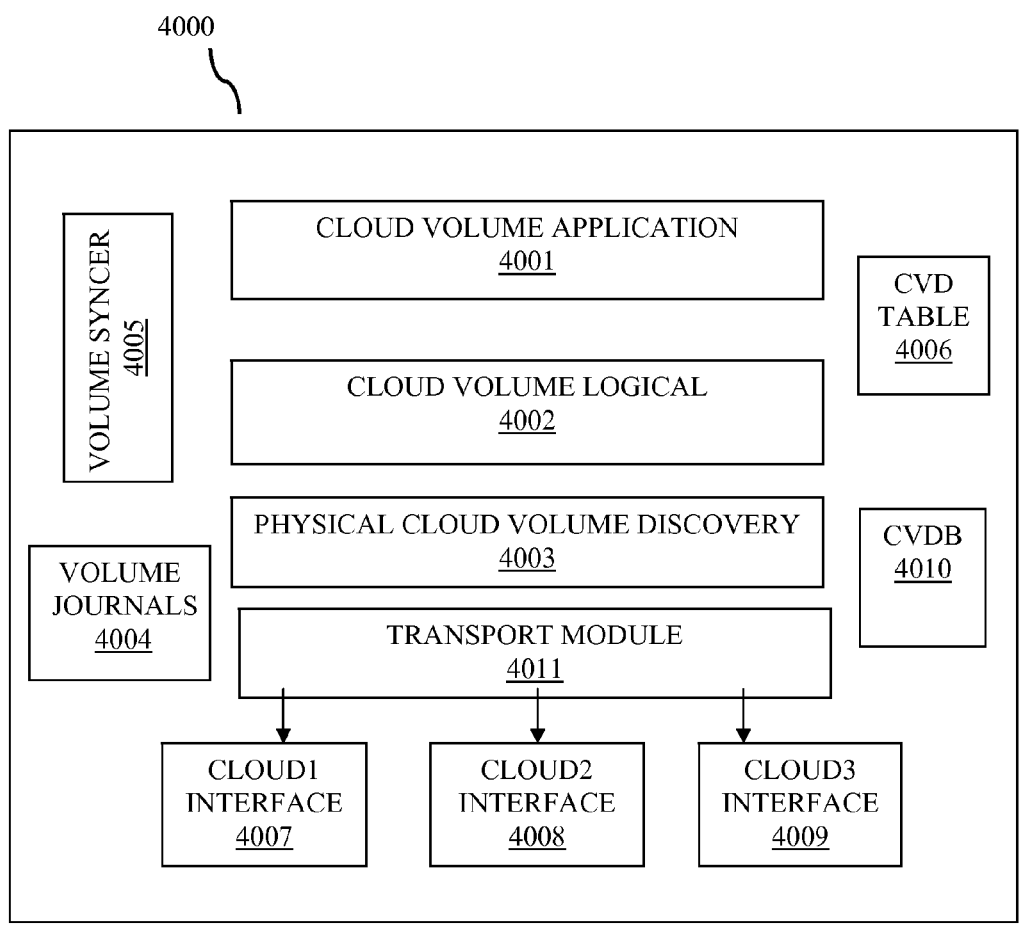
FIG. 11 is a block diagram illustrating the components of cloud or on-premise based Logical Volume Manager (LVM) in accordance with an embodiment of the present disclosure.
Figure 11A:
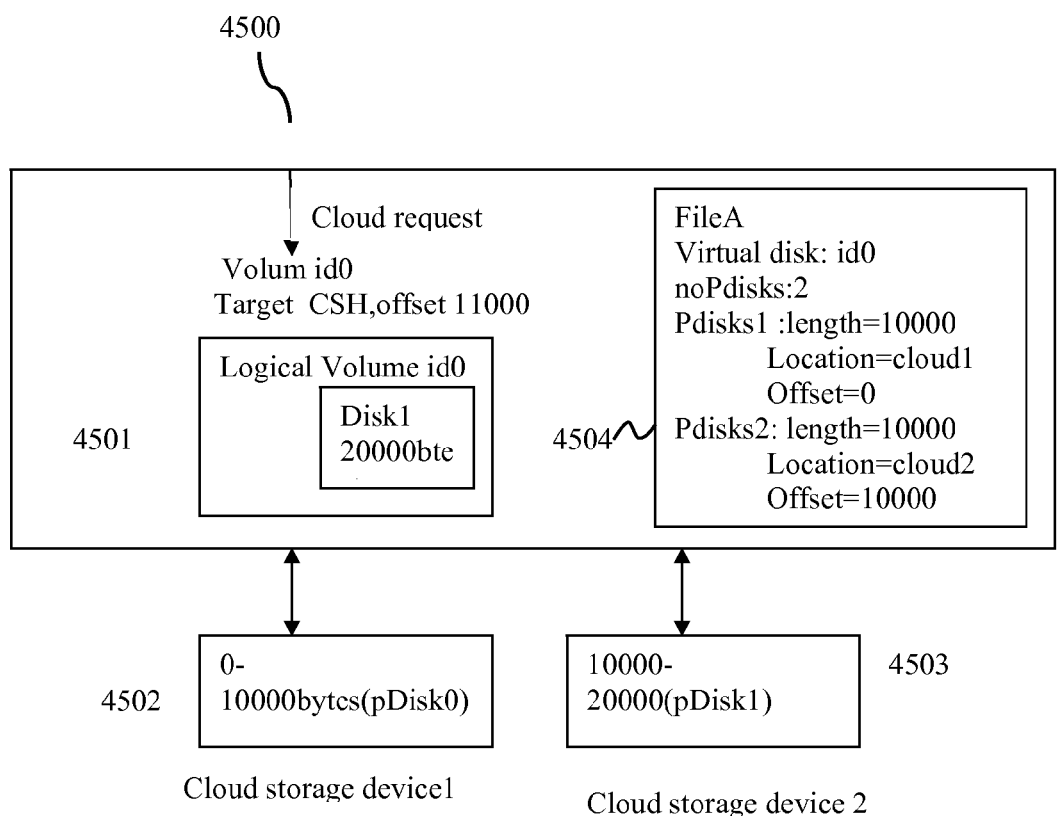
FIG. 11A is the block diagram explaining the storage parameter translation for cloud storage virtualization in accordance with an embodiment of the present disclosure.
Figure 12:
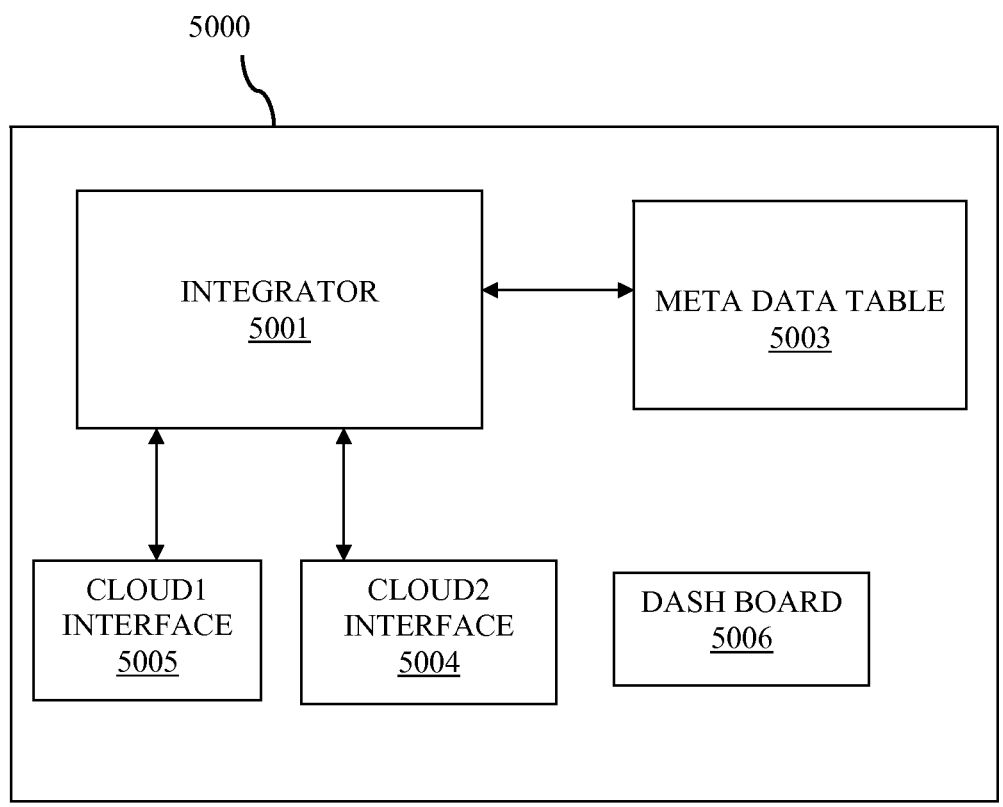
FIG. 12 is a block diagram of the components of cloud storage integration module in accordance with an embodiment of the present disclosure.

Referring to FIG. 11, 4000 illustrates an example of the internal block diagram of the component where cloud based Logical Volume Management (LVM) or the logic for cloud storage virtualization service across multiple providers, is implemented. The Logic performed to implement cloud storage virtualization data service is as follows: When component starts the operation, a physical cloud volume discovery module 4003 discovers all the cloud storage resources and updates the information in cloud volume database (CVD) 4010 (persistent storage) as well as in CVD table 4006. Information can be as simple as just the name of the providers, container names, container handles to access it etc. The physical cloud volume discovery module 4003 will then issue cloud APIs to initialize the virtual cloud disks of any size. Then the size info, object file info updated into Cloud Volume Database table 4006. Similarly storage parameters of all storage resources of all storage clouds configured for cloud based LVM are discovered and stored in the CVD table for faster lookup. The physical cloud volume discovery module 4003 will then persist the cloud volume labels, IPs, logical block numbers and related metadata information into the respective backing files of the virtual disks in 512 bytes at a specific location. Another 512 bytes will be reserved to keep bitmap info to store the status of each cloud volumes (such as it is being in sync with other volumes or not). Mapping information is constructed for each identified physical cloud volumes to logical cloud volumes and updated in the CVD table. When a user file size exceed the limit imposed by a provider, cloud proxy will set up the logical address space and mark this as a big file in the CVD, and stores all physical offsets, lengths that make up this file in the cloud storage, so that file can be read by cloud proxy by reconstructing parts of the file based on the logical offsets. This way, a user can now store a big file which is bigger than provider imposed maximum file size (For example, a cloud storage provider allows a maximum file size of 4 GB). Cloud logical volumes can be grown independent of the physical volumes, because only the logical offsets of the cloud logical volumes need to be updated, and such cloud volume abstraction offers attractive technical case. When any IO request arrives from a cloud volume applications module 4001, the container name or logical volume name is mapped to correct cloud volume offset numbers, by looking up to the CVD table and then write requests are issues to the respective cloud volumes with the respective cloud APIs. If any of the IO request fails, full information such as the target cloud volume ID, write request data, metadata, cloud provider ID, customer credentials, write length, etc. are stored in a local storage named volume journal 4004. The volume journal 4004 also will set a flag, kicking off a volume syncer 4005 which will periodically sync all the data to the cloud that failed. If any write fails to any cloud volume, the corresponding bit is marked as stale, so that further write to the volume is not performed other than the volume syncer. In such a manner, ideas such as stripped volumes, or mirrored volumes can be implemented along with this disclosure. In this way, CSH architecture be used to implement file level, cloud storage virtualization across multiple cloud storage provider devices. Referring to FIG. 11A, 4500 is an illustrative block diagram of one embodiment of the invention, the cloud virtualization module. 4502 and 4503 are cloud storage devices. A cloud request is arriving for virtual disk with id0, using CSH as the virtual cloud id, with an exported storage size 2000 to customer. When a request arrives to do any storage operation where first parameters are (virtual storage/container=id0, target=CSH, offset=11000), CSH will translate to a second parameters, based on the info in the CVD table 4504. CSH finds that virtual volume id 0 has two physical disks, that physical disk 1 is located at cloud 1 and physical disk 2 is located at cloud 2, and the specific storage volumes of respective physical disks are 1000 bytes each and that physical disk1 hosts the first 10000 bytes of the virtual disk, and that physical disk 2 host the second 10000 bytes of the virtual disk. So CSH will determine the offset 11000 is located at pdisk2 as it starts from the offset 10000 of the virtual volume id0. As file's offset is at 11000, CSH will convert the disk id as pdisk2, as 11000 address is hosted in the second disk as mapped by the CVD table 4504. Convert the cloud id as cloud2, and the offset as 1000 (subtracting the storage hosted by pdisk1 from the virtual offset in the cloud request). So now the second storage parameters are: (volume=pdisk2, target=cloud2, offset=1000). And the actual cloud storage request is sent to Cloud storage device at cloud 4503, which will process the cloud request and then send back the reply, containing a unique handles, total space left, transaction id for the service performed etc to CSH. Which is third storage parameters. CSH will in turn translate back to a new handle, new transaction id, result code, cloud id which is created by CSH, and the total space left at virtual disk, which are the fourth storage parameters. Similar way, a file which is bigger than any of the physical disk located at different cloud storage providers, can be hosted as if it is stored in a single disk, due to these translation of the parameters done by CSH as the cloud request proceeds from client to CSH, then to cloud storage devices, back to CSH and then back to clients coupled with the process of directing the traffic to different cloud storage devices. This example of illustration of cloud storage virtualization method is in accordance with at least one of the embodiment of the invention Referring to FIG. 12, 5000 illustrates an example of the internal component of storage integration table that integrates all data that spans across all storage clouds. Whenever any IO is executed to any cloud proxy, all metadata is stored in metadata table 5003. It includes the information such as cloud provider name, provider specific metadata, container names/bucket names, file handle, object handles, directory information etc. This metadata is globally distributed, and it is also streamed back to a customer site if they pay for that service. When a customer wants to see all of his storage objects that's stored across all storage clouds, Cloud proxy then issue a query to the metadata table and display the aggregated view of all storage objects of this customer by the storage dashboard module 5006. With this, a customer gets an integrated view of all data in one place. In this way CSH architecture can be used to implement cloud storage integration across multiple cloud providers. When a client request for all storage containers, (All_containers as the first storage parameter), CSH will lookup the table, find all containers which are part of this, issue those container names to cloud storage devices as the second storage parameters. When reply from cloud replies arrives, cloud replies (third storage parameters) are aggregated to a single info (fourth storage parameter). Storage parameters are mapped similar to the explanation [1000]. Further to this explanation, for an illustrative purpose, customer may have just 1 container, with name containerA. And have stored 1000 files. When customer send a request to see all objects, it send the parameters (containerA, CSH). CSH will then look the internal database, finds the fact that this specific customer stored container A in 2 cloud storage devices, with container names contA and contB and CSH will create second storage parameters as (cloud1:contA, cloud2:contB) and send to respective cloud storage devices. When reply arrives to CSH, CSH will receive a third storage parameters from cloud storage devices, which are (contA:100 objects) from first cloud storage device, and (contB:900 objects). storage integration module translate the storage parameters again, to indicate that client doesn't realize that both objects are stored in different cloud storage devices. CSH will aggregate all objects into a single container and create the fourth storage parameters as (container A, 1000 objects) and respond to client. This the illustrative implementation of the logic of cloud storage integration module.

The present disclosure also relates to uses where one CSP can completely migrate the data of a customer, while customer is still accessing data. Details are described as below.

Cloud storage migration starts off with metadata copy operation from source cloud to destination cloud. Cloud proxy keeps tracks of all meta data information to satisfy all the request and is aware of any file or storage access, if the file/object in question is being moved by the CSP, if cloud proxy detects any file move while it is open, it replicates all update operations to the target CSP, for which cloud proxy keep all state information, there by file or storage movement across cloud becomes transparent to the client. In another embodiment cloud proxy aggregate all file/storage objects stored in all CSP's as it, it is available in single virtual cloud storage.

In another embodiment, it is also possible that same data of file or block level data can be dispersed across various cloud providers in such a way that the functionality of RAID technology can be realized at a higher, cloud provider level. For example, a single file or a block can be stored in two different providers, or two files/objects/blocks of the same size, can be stored in two different providers and a parity file can be stored in a third provider, realizing RAID level 2/3. Similarly other levels of RAID functionality can be realized at cloud level, and we hereinafter refer this new technique as cloud RAID across multiple cloud providers. In at least one embodiment, if a cloud provider goes out of business, all the data it stores can be moved to cloud provider in a way that doesn't disrupt the file/block/object access as VCSN intercept all traffic and provide necessary virtualization layer. If a file or object is being accessed while it is being moved, VCSN detects that, and either skips that object and moves to another object or replicate all data simultaneously to both clouds, if there is a conflict or journal all update operations, avoiding the data corruption as well as allowing the migration process proceed on the other side realizing a new method of non-disruptive cloud storage migration. In this way, cloud storage migration across multiple cloud storage providers can be implemented.

Figure 8:
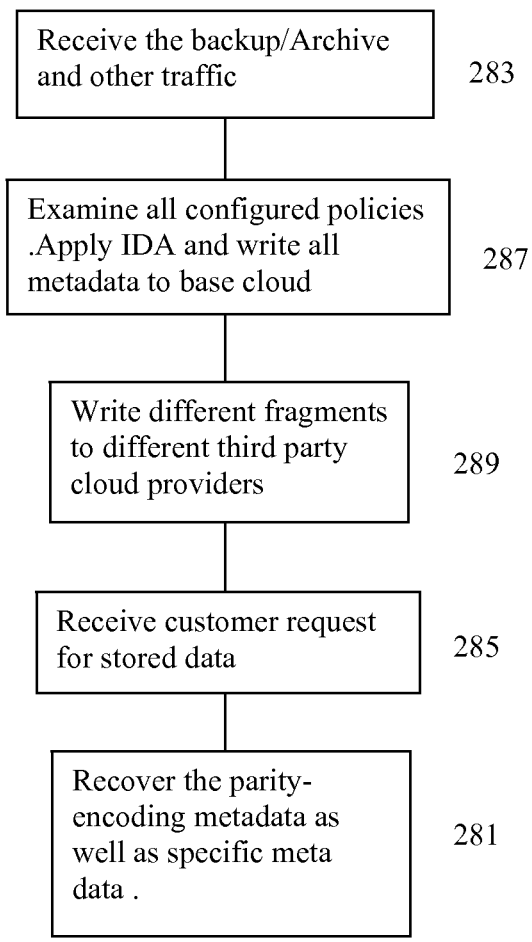
FIG. 8 is a flowchart to illustrate secret-splitting and distributed parity encoding in accordance with an embodiment of the present disclosure.

During the data dispersal, various information dispersal algorithms can be used. In at least one embodiment, secret splitting and Reed-Solomon encoding is combined and the resulting fragments are stored in different cloud providers for information-theoretical security as well as n-m reliability. For example, referring to FIG. 8, at step 283, backup or archival data stream is received. At step 287, after reading the policies configured, data stream is first applied to secret splitting, and then Information Dispersal Algorithms (IDA) are applied, and the necessary information to recover the fragments are stored in the VCSN. In step 289, different fragments are written to different cloud providers. On a regular basis, VCSN keep track of storage integrity, and it responds to any customer that requests a proof of integrity. When a customer request arrives for recovering data as in step 285, it rebuilds the fragments and then applied to reverse process of secret splitting and delivers to the customer as in step 281.

VCSN can also intercept all requests passing through it, and then journal all the requests, be it storage protocol requests, or SQL requests, or REST/HTTP requests or RDP/VDI requests. VCSN can use the journal for activity reporting, security logging, or for the billing purposes. Activity logs can also be used for storage or server replication purpose, so that WAN mirroring of any storage or REST servers can be realized. As the storage or VDI or REST servers can be replicated, global load-balancing of these servers are also possible, based in the cloud.

Figure 14:
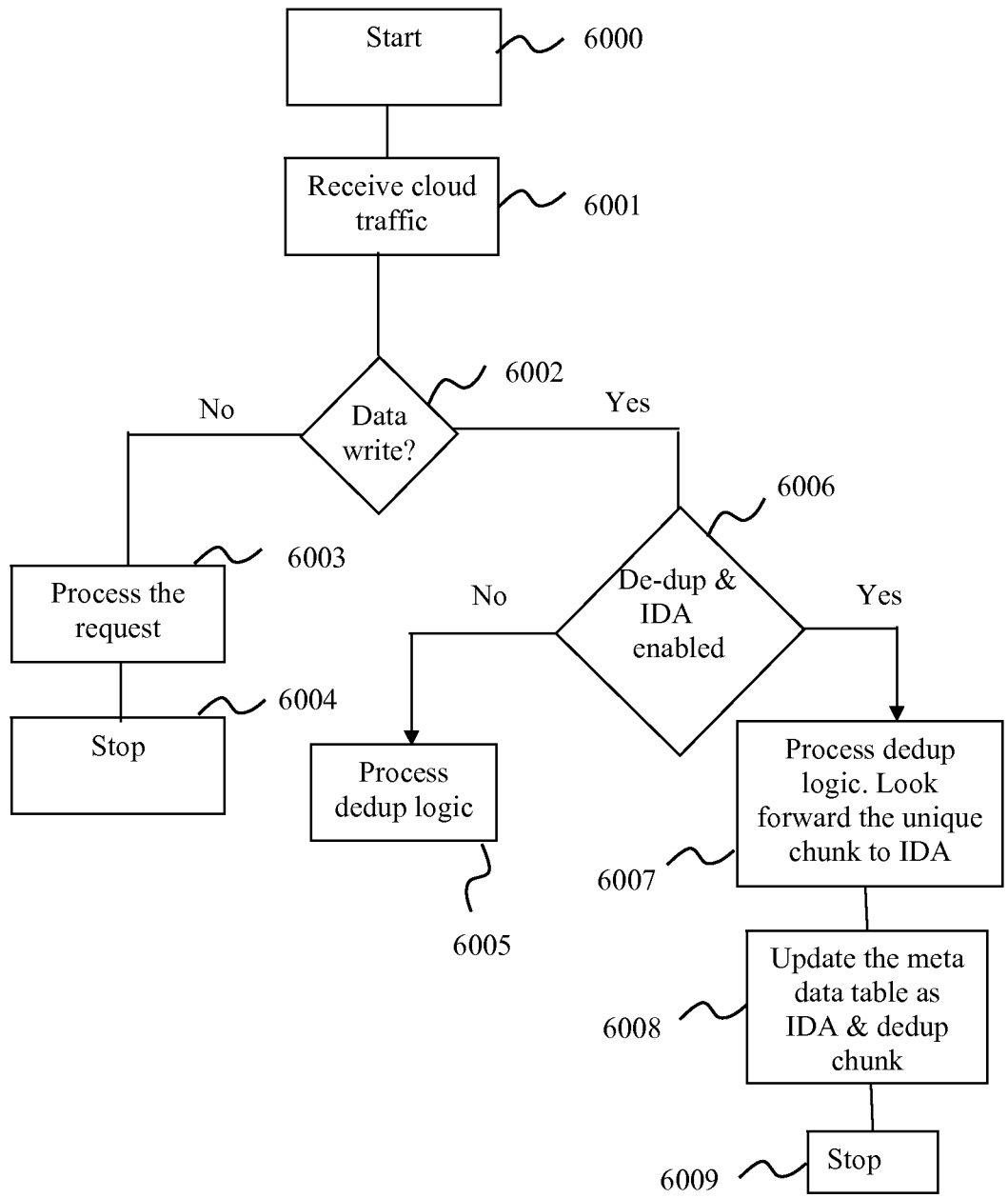
FIG. 14 is a flow chart illustrating de-duplication and information dispersal method in accordance with an embodiment of the present disclosure.

In addition to above embodiment, in another embodiment VCSN implements a secure cloud storage de-duplication, where each file or object is de-duplicated first and then erasure coded and stored to different third-party cloud storage providers. Referring to FIG. 14, cloud based de-duplication starts at step 6000. At step 6001 CSH receives the new cloud API request. At step 6002 a check is performed to see any update operation. If it's a query operation, it retrieves the information requested to the customer, based on the state information from the metadata table in the CSH and issuing cloud request to storage cloud if necessary through steps 6003 and 6004. If this is an update operation, algorithm check if this is configured for both information dispersals as well de-duplication at step 6006. Based on the result it will execute de-duplication functionality and information dispersal at 6007 or. At step 6008, all metadata is updated after the completion of de-duplication as well as information dispersal phase. At 6005 it will execute only dedup service.

When a cloud API arrives, CSH extracts the file level request, identifies that the request involves a de-duplication traffic by looking at a specific byte position of the API data content. CSH will then prepare for de-duplication processing, and reply to the client machine with a chunk request. Customer applications using the agent that has integrated cloud API software which is part of the implementation of invention, will send the list of all chunks of the file, which will process all chunks in standard chunking methods, and send all chunks to CSH. CSH will then look up its metadata, which are globally distributed across multiple cloud providers. Then, CSH will identify the chunks which are unique, by looking up its dedup meta table where all indexes of chunks are stored, and send a reply back to client with the chunk numbers needed, to which the client responds with the unique chunk data for the same. CSH will then store all chunks in different storage clouds, by updating the global metadata table with the complete information of the new index of the locations of the new chunks stored. When a file recovery request arrives for a de-duplicated data, local metadata table is examined, all relevant information is retrieved such as all chunk needed to create this file, and all chunk location. CSH will then issue a separate cloud API for each chunk, retrieve the chunk from the physical clouds, and re-create the file and deliver the file to the customer. In this way, a method of implementing cloud storage de-duplication across multiple cloud storage providers is realized, based on the CSH architecture.

Figure 15:
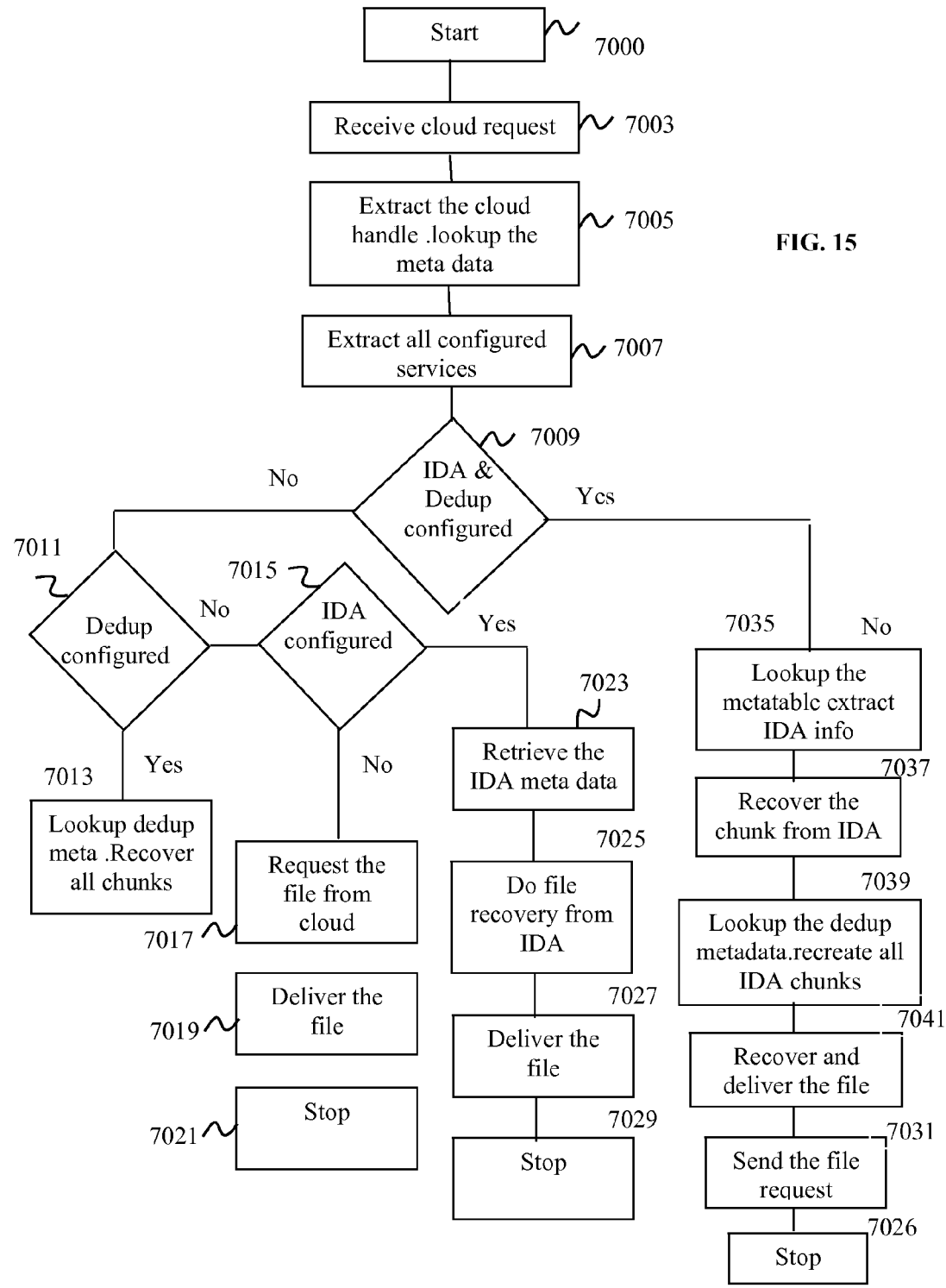
FIG. 15 is a flow chart showing file recovery side of de-duplication and information dispersal method in accordance with an embodiment of the present disclosure.

Referring to FIG. 15, method for an object request starts at step 7000. At steps 7003, 7005 and 7007 the method processes and extracts parameters from the request. At step 7009, the configuration of both the information dispersal and de-duplication is checked. If both de-duplication and information dispersal is configured, at step 7035, metadata table is looked up, all information to recover all fragments of this object are extracted, which are derived from metadata of de-duplication information, and issue requests to recover the reed-solomon encoded fragments from the CSH. CSH will recover the fragments into the file at step 7037, which is then fed to recover the actual chunks of the file at step 7039. At step 7041 all de-duplicated chunks are restored to create the original file and deliver the file. At steps 7011 check is done if dedup is configured, and if it is configured, the file is recovered using de-duplication metadata at step 7013. At step 7015, the method looks up for IDA configuration, and at step 7017, a simple cloud request is made by the CSH to get the file from the actual cloud and delivers to the customer. At steps 7023 and 7025, the method follows recovery logic for information dispersed file. It first gets all the fragments information from the metadata table, issue fragment id to the information dispersal layer, and get the recovered objects to the CSH. This is how de-duplication and information dispersal can be combined and applied to CSH.

Figure 13:
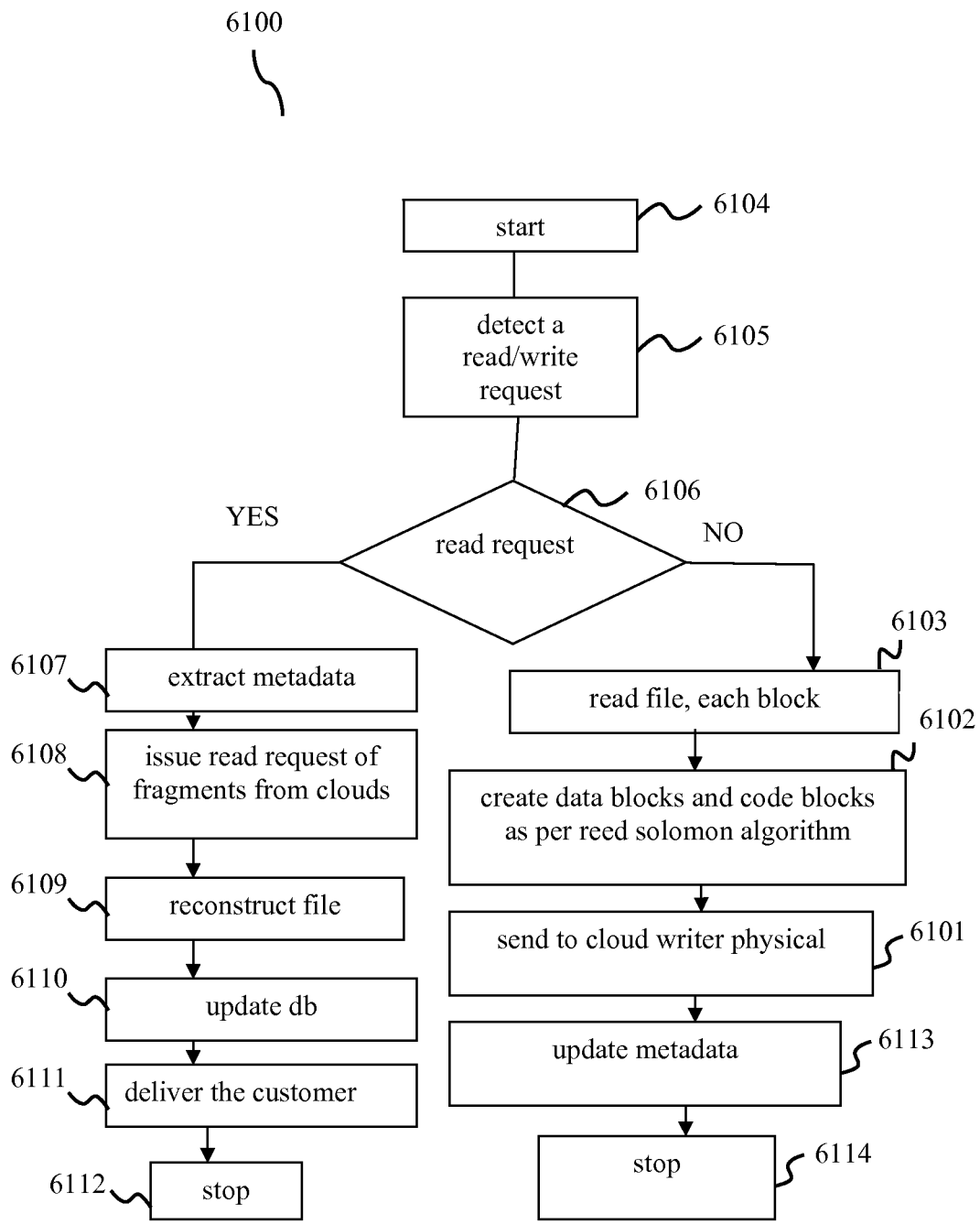
FIG. 13 is a flowchart of information dispersal module implementing cloud RAID in accordance with an embodiment of the present disclosure.
Figure 13A:
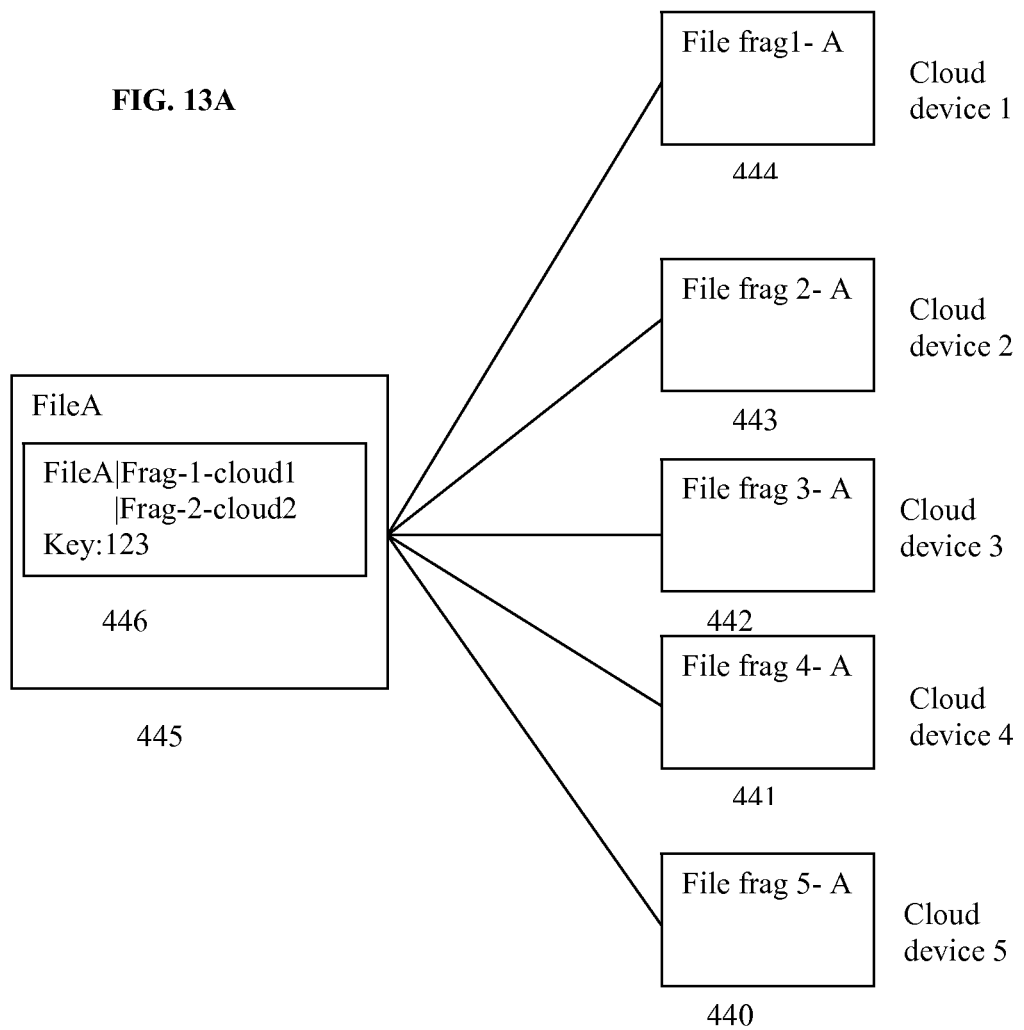
FIG. 13A is the block diagram explaining information dispersal and restore of files in accordance with an embodiment of the present disclosure.

In one embodiment, CSH implements cloud based RAID based on reed Solomon algorithm. The logic for information dispersal service is as follows. The present disclosure also implement algorithm to m-n dependencies with reed-Solomon erasure coding techniques. Various algorithms can be selected to implement various types of RAID (Redundant array of Independent Disks) technologies across cloud storage, at higher level semantics, realizing a new method of secure, cloud level RAID. Referring to FIG. 13, which illustrate one type of RAID algorithm, at step 6104 algorithm start, and at 6105 it detects a READ/WRITE event and at 6106 checks for READ, if NO it proceeds to reads the source file at step 6103 extracted from the cloud API block by block. At step 6102, each block is encoded as per reed Solomon algorithm and at step 6101, erasure coded block is sent to different clouds. At step 6113 I update the metadata at step 6114 it is finish. At step 6107 it is executing a READ cloud request, extracting metadata for recovering the fragments, to execute the recovery logic. At 6108 it issue read requests from multiple clouds, and at step 6109 it reconstruct the file. At step 6110 it updates the DB and it delivers the data to customer at step 6111. It finish the logic for recovery at step 6112. Unlike traditional RAID, CSH implements RAID technology on a file level abstraction. In an exemplary embodiment, given two files of size x, CSH converts it into three files of size x/2. Using reed Solomon algorithm, CSH reads every two bytes from the source file, and create three bytes of data, and writes each byte into three different fragments. For recovery, any of the fragments can be un-available. If customer needs a redundancy of x, reed Solomon algorithm can code the source file in such a way that any of the x fragments can be lost. The reed Solomon algorithm creates n fragments of the source file, out of which only m fragments are necessary, while n>m and n−m=x. Standard RAID algorithms or based parity coding allow 1 node to fail. RAID 6 allows double parity protection. The present disclosure discloses n−m redundancy method based on reed Solomon for cloud storage traffic. If a customer needs x times the redundancy, it has to replicate x times, causing the storage utilization to be x times the source object size, whereas CSH will only have the overhead of n/m. CSH keeps enough metadata information in the CSH database, such as the global name of the object, the internal cloud numbers that the fragments of the files are sent, each cloud handle of each fragment etc. so that when a file needs to be restored, metadata table can retrieve all data needed to recover all fragments needed to recover the file. This cloud based RAID is implemented as software, and runs in CSH component which is running in the cloud proxy. Referring to FIG. 13A, 445 illustrate the part of CSH that does the information dispersal service for n=5 and m=3. When a request arrives with a store request for a file, in this example file A, 445 apply reed-solomon algorithm, and make it to 5 fragments of 5/3 size of the file A. First Fragment is filefrag1.A, which is sent to cloud storage device 444. Second fragment is filefrag2.A which is sent to cloud storage device 443, third fragment is filefrag3.A which is stored in cloud storage device 442, fourth fragment is filefrag4.A which is stored in cloud storage device 441, and fifth fragment is filefrag5.A which is sent to cloud storage device 440. CSH, in 446, stores the cloud id information for each fragments as (frag1→cloud 1), (frag2→cloud 2), (frag3→cloud 3), (frag4→cloud 4),(frag 5→cloud 5). It also stores the key index 123, for the file name file A. Hence when ever it receive a request from the client for (file A, key 123) as the first storage parameters, it look up the table with key as the index to find the record for the metadata, and substitute for file A with fragment names, and cloud locations for each fragments as the second storage parameters, and send the request to any 3 of the cloud storage devices to recover the file. Cloud storage devices will return the no of bytes read, current offset, any error code if any as the third storage parameters. Cloud information dispersal data service module will combine the three fragments, translate the file name back as file A, and the total size as the size of the total file length as the fourth storage parameters. Cloud reply, along with data and fourth storage parameters are sent to client. This is the logic of cloud information dispersal, which is also used in cloud RAID, process of translation of the storage parameters are same. This way, information dispersal logic, cloud RAID service as well as cloud storage virtualization logic perform storage parameter translations when cloud request go to the directions of clients-to-cloud storage devices, as well as cloud storage devices-to-back to clients. As mentioned in section [1000], same translation is performed in both ways, for cloud storage virtualization as well.

As described in sections [1000], [1500] and [2000]above, CSH perform the translation of storage parameters according the service needed and based on the metadata in the meta data table to implement the cloud virtualization. It specifically translate storage parameters for cloud RAID, information dispersal (both described in section 1000), and cloud storage virtualization, as described in section 2000 performed at both directions. All data services mentioned in the disclosure, is executed partly when data goes to cloud storage devices, and partly when replies come back from cloud storage devices.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A virtual cloud storage system comprising:
a processor; and
a memory communicatively coupled to the processor, wherein the memory stores processor-executable instructions, which, on execution, causes the processor to:
receive cloud service request from at least one client machine to perform cloud storage services on a data;
identify one or more cloud storage service providers for processing the request based on metadata of the at least one client machine, wherein the cloud storage service providers comprise cloud storage devices for providing cloud storage services;
extracting first storage parameters from at least one of the cloud service request;
performing data services on the cloud service request;
sending the cloud service request to the identified one or more cloud storage service providers using second storage parameters, wherein second storage parameters are created by translating the first storage parameters;
receiving reply from the identified cloud storage service providers along with third storage parameter, in response to the cloud service request; and
translating the reply and the third storage parameters to fourth storage parameters;
updating a database of the virtual cloud storage system with the information about the data, a part of the first, second, third and fourth storage parameters and the data services performed,
wherein the virtual cloud storage system is configured to operate, in a manner that is transparent to both the at least one client machine and the cloud storage service providers, by using respective cloud service protocols of the at least one client machine and the cloud storage service providers, and the virtual cloud storage system intercepts all cloud requests from the at least one client machine and cloud replies from the cloud storage service providers.

2. The system of claim 1, where-in data services are at least one of result of data engineering or transformation operation creating a second set of data with a first set of data.

3. The system of claim 1, wherein the data services are performed on at least one of data exchanged between the at least one client machine and the virtual cloud storage system and the data stored in the one or more cloud storage devices.

4. The system of claim 1, wherein the data service is at least one of cloud storage virtualization, cloud storage management, cloud storage migration, cloud storage integration, cloud RAID, cloud storage de-duplication and information dispersal across the one or more cloud storage devices, located at, operated and managed by the one or more cloud storage service providers.

5. The system of claim 1, wherein the at least one virtual cloud storage system stores part of the data related to the at least one client machine in the database.

6. The system of claim 1, wherein the at least one virtual cloud storage system stores the data of the at least one client machine in the one or more cloud storage devices after de-duplicating the data.

7. The system of claim 1, wherein the at least one virtual cloud storage system stores the data of the at least one client machine by dividing the data into multiple fragments and storing each of the multiple fragments in the one or more cloud storage devices.

8. A method to implement cloud storage hypervisor, to manage storage using virtual cloud storage system, comprising:
receiving, by a virtual cloud storage system, a cloud service request from at least one client machine to machine to perform cloud storage services on a data;
identify, by the virtual cloud storage system, one or more cloud storage service providers for processing the request based on metadata of the at least one client machine, wherein the cloud storage service providers comprise cloud storage devices for providing cloud storage services;
extracting, by the virtual cloud storage system, first storage parameters from at least one of the cloud service request;
performing data services on the cloud service request;
sending, by the virtual cloud storage system, the cloud service request to the identified one or more cloud storage service providers using second storage parameters, wherein second storage parameters are created by translating the first storage parameters;
receiving, by the virtual cloud storage system, reply from the identified cloud storage service providers along with third storage parameter, in response to the cloud service request; and
translating, by the virtual cloud storage system, the reply and the third storage parameters to fourth storage parameters;
updating, by the virtual cloud storage system, a database of the virtual cloud storage system with the information about the data, a part of the first second, third and fourth storage parameters and the data services performed.

9. The method of claim 8, wherein the one or more data services are selected from a group comprising data de-duplication, information dispersal, data integration, data migration, RAID, cloud storage virtualization or more data transformation algorithms.

10. The method of claim 8, wherein the data services are performed on at least one of data exchanged between the at least one client machine and the one or more cloud storage devices and data stored in the cloud storage devices.

11. The method of claim 8, wherein the data corresponding to the client machine is replicated across the one or more cloud storage devices of one or more cloud storage service providers.

12. The method of claim 8, wherein the metadata for de-duplication and information dispersal is stored in the cloud storage devices and the database of the one or more cloud proxies.

13. The system of claim 1, wherein the virtual cloud storage system comprises one or more cloud proxies performing as a virtual, cloud storage network.

14. The system of claim 13, wherein information about the data exchanged and the data services performed is replicated to the one or more cloud proxies of the virtual cloud storage system.

15. The system of claim 1, wherein the virtual cloud storage system and the at least one client machine are connected through at least one first network interface.

16. The system of claim 1, wherein the virtual cloud storage system and the at least one client machine are connected through at least one second network interface.

17. The method of claim 8, wherein the virtual cloud storage system comprises one or more cloud proxies.

18. The method of claim 17, wherein, with information about the data exchanged and the data services performed is replicated to the one or more cloud proxies of the virtual cloud storage system.

19. The method of claim 8, wherein each of the virtual cloud storage system, the at least one client machine and the cloud storage service providers process data using a pre-defined protocol.

20. The method of claim 8, wherein the at least one virtual cloud storage system stores the data of the at least one client machine in the one or more cloud storage devices after de-duplicating the data.

21. The method of claim 8, wherein the at least one virtual cloud storage system stores the data of the least one client machine by dividing the data into multiple fragments and storing each of the multiple fragments in the cloud storage devices.

* * * * *